(12) United States Patent
Uehara

(10) Patent No.: US 9,317,093 B2
(45) Date of Patent: Apr. 19, 2016

(54) COMPUTER SYSTEM SELECTIVELY DIRECTING POWER TO A BATTERY FROM EITHER A BACKUP POWER SUPPLY OR A NORMAL POWER SUPPLY BASED ON A REDUCTION OF VOLTAGE MEASURED FROM ONE OR MORE DETECTION CIRCUITS

(71) Applicant: FUJITSU LIMITED, Kawasaki-shi, Kanagawa (JP)

(72) Inventor: Mikio Uehara, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 336 days.

(21) Appl. No.: 13/758,192

(22) Filed: Feb. 4, 2013

(65) Prior Publication Data
US 2013/0246815 A1    Sep. 19, 2013

(30) Foreign Application Priority Data
Mar. 19, 2012    (JP) ................. 2012-062724

(51) Int. Cl.
| G06F 1/00 | (2006.01) |
| G06F 1/30 | (2006.01) |
| H02J 1/04 | (2006.01) |
| G06F 1/32 | (2006.01) |
| H02J 9/06 | (2006.01) |

(52) U.S. Cl.
CPC ............... *G06F 1/30* (2013.01); *G06F 1/3203* (2013.01); *H02J 1/04* (2013.01); *H02J 9/061* (2013.01); *Y10T 307/625* (2015.04)

(58) Field of Classification Search
CPC ............................ H02J 9/062; G06F 1/3203
USPC ........... 307/64, 31, 82, 80, 66; 713/300, 310, 713/324; 700/245; 365/226; 320/137
See application file for complete search history.

(56) References Cited

U.S. PATENT DOCUMENTS 5,424,994 A * 6/1995 Nagasawa ............... G06F 1/30
                                                          365/226
7,446,432 B2 * 11/2008 Cha ............................... 307/64

(Continued)

FOREIGN PATENT DOCUMENTS

| JP | 5-165738 | 7/1993 |
| JP | 7-111741 | 4/1995 |
| JP | 2003-79069 | 3/2003 |

OTHER PUBLICATIONS

Japanese Office Action dated Sep. 1, 2015 for corresponding Japanese Patent Application No. 2012-062724.

*Primary Examiner* — Thomas Lee
*Assistant Examiner* — Aurel Prifti
(74) *Attorney, Agent, or Firm* — Staas & Halsey LLP

(57) ABSTRACT

A backup power supply device that is used as a backup for a normal power supply device that includes a first converter configured to convert a first alternating-current voltage into a first direct-current voltage and a second converter configured to convert the first direct-current voltage into a second direct-current voltage includes a first detector that is coupled to an output of the first converter and outputs a first detection signal when the first direct-current voltage is lower than a first predetermined value; a third converter that converts a second alternating-current voltage into a third direct-current voltage; a battery that is charged by the third direct-current voltage; and a first switch that connects an output of the battery or an output of the third converter to an input of the second converter based on the output of the first detection signal.

15 Claims, 20 Drawing Sheets

(56) References Cited

U.S. PATENT DOCUMENTS

| | | | |
|---|---|---|---|
| 2004/0068670 A1* | 4/2004 | Suzuki et al. | 713/300 |
| 2004/0088589 A1* | 5/2004 | Westerinen et al. | 713/300 |
| 2008/0093930 A1* | 4/2008 | Chen | 307/66 |
| 2008/0172566 A1* | 7/2008 | Park | 713/310 |
| 2008/0246438 A1* | 10/2008 | Lu | H02J 7/027 320/137 |
| 2008/0250256 A1* | 10/2008 | Hagiwara | 713/300 |
| 2008/0272650 A1* | 11/2008 | Chen | 307/31 |
| 2008/0291879 A1* | 11/2008 | Duff et al. | 370/338 |
| 2009/0127935 A1* | 5/2009 | Hung et al. | 307/80 |
| 2010/0180138 A1* | 7/2010 | Yen et al. | 713/324 |
| 2010/0201200 A1* | 8/2010 | Hori | 307/82 |
| 2011/0213999 A1* | 9/2011 | Lecourtier | 713/324 |
| 2013/0310974 A1* | 11/2013 | Iwata | 700/245 |

* cited by examiner

COMPUTER SYSTEM SELECTIVELY DIRECTING POWER TO A BATTERY FROM EITHER A BACKUP POWER SUPPLY OR A NORMAL POWER SUPPLY BASED ON A REDUCTION OF VOLTAGE MEASURED FROM ONE OR MORE DETECTION CIRCUITS

CROSS-REFERENCE TO RELATED APPLICATION(S)

This application is based upon and claims the benefit of priority of the prior Japanese Patent Application No. 2012-062724, filed on Mar. 19, 2012, the entire contents of which are incorporated herein by reference.

FIELD

The embodiments discussed herein are related to a backup power supply device, a power supply system, a computer system, a method for controlling power supply of a computer system, and a recording medium.

BACKGROUND

A computer device such as an information processing device or a storage device is coupled to a normal power supply device and a backup power supply device such as an uninterruptible power supply in order to inhibit a system operation from being stopped due to the stop of an external power supply such as a commercial power supply and inhibit data from being lost. A backup power supply device of this type includes a detecting circuit (detector) and a switching circuit (switch). The detecting circuit detects a reduction in a power supply voltage to be supplied to the computer device. The switching circuit is used to supply a power supply voltage from a battery to the computer device in response to the detection of the reduction in the power supply voltage by the detecting circuit. Japanese Laid-open Patent Publication No. 2003-79069 is disclosed as related art, for example.

SUMMARY

According to an aspect of the invention, a backup power supply device that is used as a backup for a normal power supply device that includes a first converter configured to convert a first alternating-current voltage into a first direct-current voltage and a second converter configured to convert the first direct-current voltage into a second direct-current voltage includes a first detector that is coupled to an output of the first converter and outputs a first detection signal when the first direct-current voltage is lower than a first predetermined value; a third converter that converts a second alternating-current voltage into a third direct-current voltage; a battery that is charged by the third direct-current voltage; and a first switch that connects an output of the battery or an output of the third converter to an input of the second converter based on the output of the first detection signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a diagram illustrating an example of a process that is executed by the computer system illustrated in FIG. 6 in order to execute schedule-on;

DESCRIPTION OF EMBODIMENTS

A backup power supply device detects a reduction in a direct-current voltage using a power supply line through which the direct-current voltage is supplied from a battery to a computer device. Thus, if an electricity failure occurs and the battery is coupled to the power supply line, the voltage of the power supply line increases. When the battery is disconnected from the power supply line due to the increase in the voltage, the voltage of the power supply line is reduced. Thus, a switching circuit frequently operates so as to switch supply of a direct-current voltage to the supply from the battery, and whereby the amount of power to be consumed by the backup power supply device increases. During an electricity failure, the direct-current voltage output from the battery is supplied to the computer device and used to operate the backup power supply device. The amount of power to be consumed by the backup power supply device increases. If a period of time to use the battery is reduced, a time period in which the computer device is operated by the direct-current voltage supplied from the battery is also reduced. As a result, if an electricity failure occurs and the backup power supply device operates, the direct-current voltage may not be supplied to the computer device and the reliability of the computer device may be reduced.

The embodiments are described with reference to the accompanying drawings. Reference symbols that are the same as the names of signals are used for signal lines through which the signals and voltages are supplied.

Figure 1:
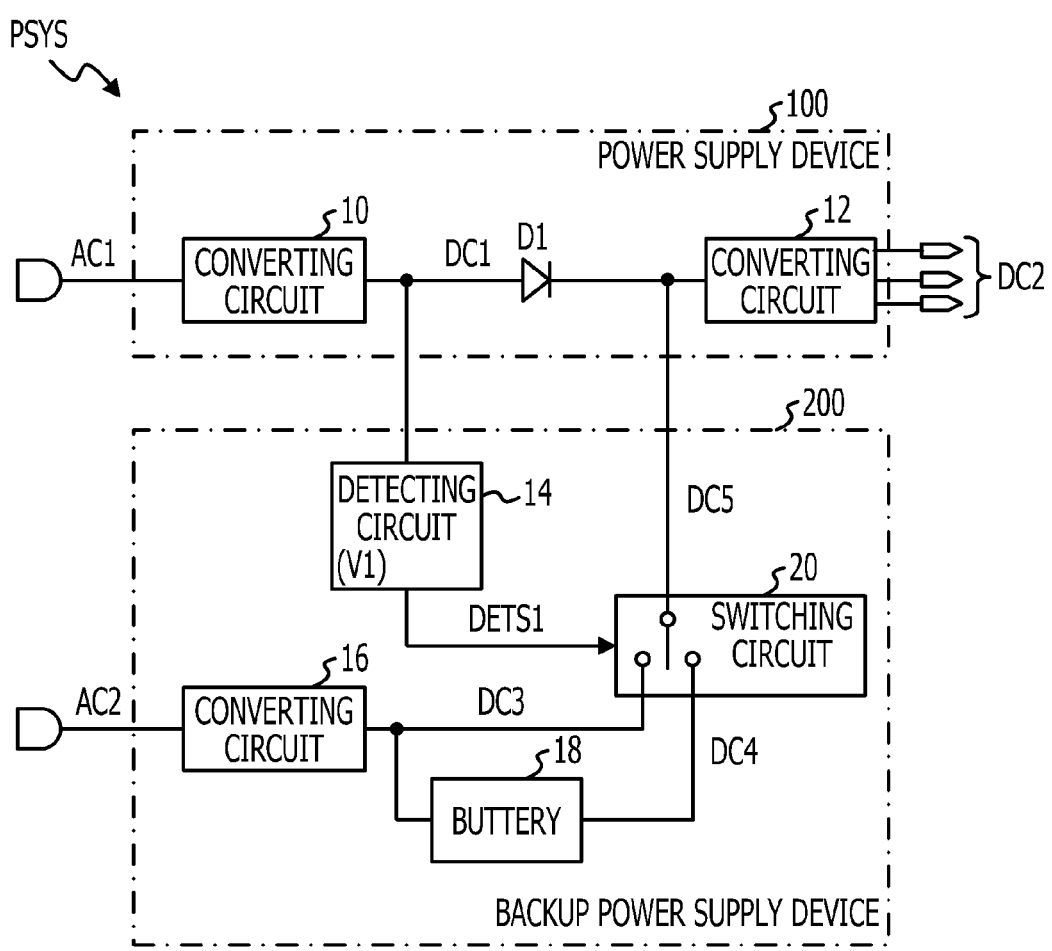
FIG. 1 is a diagram illustrating an example of a backup power supply device and a power supply system according to the first embodiment.

FIG. 1 is a diagram illustrating an example of a backup power supply device and a power supply system according to the first embodiment. A power supply system PSYS includes a power supply device 100 and a backup power supply device 200. The power supply device 100 is an example of a normal power supply device that supplies a direct-current voltage DC2 to a computer device such as an information processing device or a storage device when an alternating-current voltage AC1 is input to the power supply device 100. The power supply device 100 includes converting circuits 10 and 12 and a diode D1. The converting circuit 10 is a converter that converts the alternating-current voltage AC1 into a direct-current voltage DC1. The converting circuit 12 is a converter that converts the direct-current voltage DC1 or a direct-current voltage DC5 supplied from the backup power supply device 200 into at least one direct-current voltage DC2. An anode of the diode D1 is coupled to an output of the converting circuit 10, while a cathode of the diode D1 is coupled to an input of the converting circuit 12. Specifically, the direct-current voltage DC1 output from the converting circuit 10 is supplied to the converting circuit 12 through the diode D1 that is coupled to the converting circuit 10 on the upstream side of the converting circuit 10. Thus, a direct-current voltage is not supplied from the cathode of the diode D1 to the anode of the diode D1.

The backup power supply device 200 includes a detecting circuit 14, a converting circuit 16, a battery 18 and a switching circuit 20. An input of the detecting circuit 14 is coupled to the output of the converting circuit 10 and the anode of the diode D1. When the direct-current voltage DC1 is lower than a predetermined value (for example, 90% of the direct-current voltage DC1), the detecting circuit 14 outputs a detection signal DETS1. For example, when the direct-current voltage DC1 is lower than a value V1, the detecting circuit 14 sets the detection signal DETS1 to an active level. When the direct-current voltage DC1 is equal to or higher than the value V1, the detecting circuit 14 sets the detection signal DETS1 to an inactive level.

The converting circuit 16 is a converter that converts an alternating-current voltage AC2 into a direct-current voltage DC3. For example, the alternating-current voltages AC1 and AC2 are supplied from an alternating-current power supply such as a commercial power supply of which an effective voltage is 100 V or 200 V. The alternating-current voltages AC1 and AC2 may be supplied from the common alternating-current power supply. The alternating-current voltages AC1 and AC2 may be supplied from two alternating-current power supplies, respectively. In this case, the two alternating-current power supplies are independent of each other. The battery 18 receives the direct-current voltage DC3 and is thereby charged so as to accumulate electric charges. The battery 18 outputs the accumulated electric charges as a direct-current voltage DC4 to a direct-current voltage line DC4.

A node DC5 that is an output of the switching circuit 20 is coupled to the input of the converting circuit 12 and the cathode of the diode D1. When the detection signal DETS1 is output, the switching circuit 20 supplies one of the direct-current voltages DC3 and DC4 as the direct-current voltage DC5 to the input of the converting circuit 12. For example, when the detection signal DETS1 is at the active level, the switching circuit 20 is turned on. When the detection signal DETS1 is at the inactive level, the switching circuit 20 is turned off. When direct-current voltages DC2 of multiple types are to be generated by the converting circuit 12, a converting circuit that generates direct-current voltages of multiple types from the direct-current voltage DC5 and is to be arranged on the side of the output of the switching circuit 20 may be omitted by supplying the direct-current voltage DC5 to the input of the converting circuit 12. Thus, the size of an overall circuit of the backup power supply device 200 may be reduced, and an increase in the amount of power to be consumed may be suppressed.

The backup power supply device 200 operates as follows. For example, when the supply of the alternating-current voltage AC1 is stopped or the converting circuit 10 fails, the direct-current voltage DC1 is not newly generated, and the direct-current voltage DC1 is reduced. The detecting circuit 14 detects the reduction in the direct-current voltage DC1 and outputs the detection signal DETS1. The switching circuit 20 receives the output detection signal DETS1 and is thereby turned on. Then, the switching circuit 20 supplies one of the direct-current voltages DC3 and DC4 as the direct-current voltage DC5 to the converting circuit 12. For example, when the alternating-current voltage AC2 is supplied to the converting circuit 16, the switching circuit 20 supplies the direct-current DC3 to the converting circuit 12. When the supply of the alternating-circuit voltages AC1 and AC2 is stopped, the switching circuit 20 supplies the direct-current voltage DC4 to the converting circuit 12.

In this case, the diode D1 inhibits a current from flowing from the converting circuit 12 to the converting circuit 10. Thus, the detecting circuit 14 does not detect the direct-current voltage DC5 to be supplied to the converting circuit 12. Until the supply of the alternating-current voltage AC1 starts, the detecting circuit 14 continuously outputs the detection signal DETS1 and the switching circuit 20 is turned on so as to continuously select any of the direct voltages DC3 and DC4. In other words, the detecting circuit 14 does not repeatedly detect a reduction and increase in the direct-current voltage DC1, and the switching circuit 20 is not repeatedly turned on and off.

Thus, the amount of power to be consumed by the backup power supply device 200 may be reduced by suppressing an unwanted operation of the switching circuit 20 during the stop of the supply of the alternating-current voltage AC1. When the supply of the alternating-current voltages AC1 and AC2 is stopped, the backup power supply device 200 operates using the direct-current voltage DC4 output from the battery 18. Thus, a time period in which the power supply device 100 generates the direct-current voltage DC2 and the supply of the alternating-current voltage AC1 is stopped may be increased by suppressing an unwanted operation of the switching circuit 20 and reducing the amount of power to be consumed by the backup power supply device 200. A time period in which the computer device is operated by the received direct-current voltage DC2 may be increased. For example, a shutdown process of the computer device may be started with time to spare after the stop of the supply of the alternating-current voltage AC1. As a result, the reliability of the computer device that receives the direct-current voltage DC2 and is thereby operated may be improved.

In addition, the direct-current voltage DC5 to be supplied to the converting circuit 12 may be inhibited from pulsating due to the turning on and off of the switching circuit 20. Thus, even when the supply of the alternating-current voltage AC1 is stopped, the converting circuit 12 may generate a stable direct-current voltage DC2.

On the other hand, if the diode D1 is not included in the power supply device 100 and a direct-current voltage of the input node of the converting circuit 12 is to be detected by the detecting circuit 14, the detecting circuit 14 detects the direct-current voltage DC5 supplied from the battery 18 and stops outputting the detection signal DETS1. In this case, the switching circuit 20 is turned off, the direct-current voltage DC5 is reduced, and the detecting circuit 14 outputs the detection signal DETS1 again. In this case, the detecting circuit 14 repeatedly detects a reduction and increase in the direct-current voltage DC1, and the switching circuit 20 is repeatedly turned on and off. Thus, the amount of power to be consumed by the backup power supply device 200 may increase, and the direct-current voltage DC5 to be supplied to the converting circuit 12 may pulsate.

The direct-current voltage DC5 output from the backup power supply device 200 is supplied to the input of the converting circuit 12. Thus, when the supply of the alternating-current voltage AC1 is stopped, direct-current voltages DC2 of multiple types may be generated from the single direct-current voltage DC5. On the other hand, if the output node DC5 of the backup power supply device 200 is coupled to the output of the converting circuit 12, the backup power supply device 200 generates direct-current voltages DC5 of multiple types, like the direct-current voltages DC2.

In the present embodiment, the backup power supply device 200 detects the direct-voltage DC1 flowing on the input side of the diode D1 and supplies the direct-current voltage DC5 to the output side of the diode D1. When the supply of the alternating-current voltages AC1 and AC2 is stopped, the backup power supply device 200 may supply a non-pulsating and stable direct-current voltage DC5 to the power supply device 100 for a long time period. As a result, the power supply device 100 may supply a stable direct-current voltage DC2 to the computer device, and the reliability of the computer device may be improved.

Figure 2:
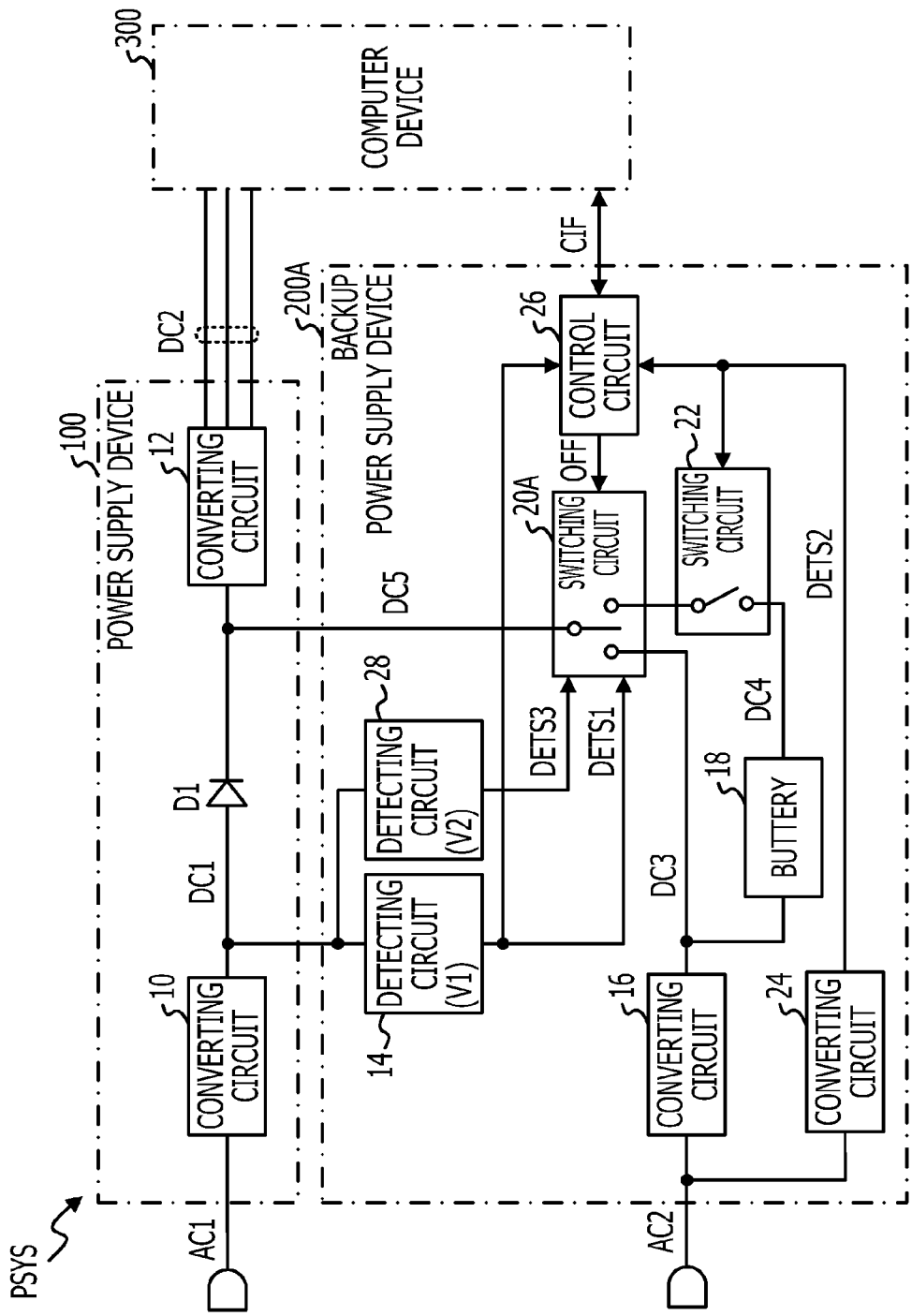
FIG. 2 is a diagram illustrating an example of a backup power supply device, a power supply system and a computer system according to the second embodiment.

FIG. 2 is a diagram illustrating an example of a backup power supply device, a power supply system and a computer system according to the second embodiment. In the second embodiment, parts that are the same as those described in the first embodiment are indicated by the same reference numerals and symbols as those described in the first embodiment, and a detailed description thereof is omitted.

The power supply device 100 illustrated in FIG. 2 is the same as the power supply device 100 illustrated in FIG. 1. The direct-current voltage DC2 that is generated by the power supply device 100 is supplied to a computer device 300. A power supply system PSYS includes the power supply device 100 and a backup power supply device 200A. A computer system includes the power supply device 100, the backup power supply device 200A and the computer device 300. For example, the computer device 300 is an information processing device or a storage device. Examples of the information processing device are a mainframe, a server, a workstation and a personal computer. An example of the storage device is a Redundant Arrays of Inexpensive Disks (RAID) device. For example, the computer device 300 is a device that executes the shutdown process before the power supply is interrupted and for which a backup process is executed before the power supply is interrupted.

The backup power supply device 200A includes a switching circuit 20A instead of the switching circuit 20 illustrated in FIG. 1. The backup power supply device 200A includes a switching circuit 22, a detecting circuit 24, a control circuit 26 and a detecting circuit 28 as well as the backup power supply device 200 illustrated in FIG. 1.

When the supply of the alternating-current voltage AC2 is stopped, the detecting circuit 24 outputs a detection signal DETS2. The control circuit 26 has a function of communicating with the computer device 300 that is coupled to the power supply device 100. The control circuit 26 is coupled to the computer device 300 through a communication interface CIF. As the communication interface CIF, a universal serial bus (USB) interface, a peripheral component interconnect (PCI) Express interface or the like is used. Operations of the control circuit 26 are described with reference to FIGS. 3 and 4. An input of the detecting circuit 28 is coupled to the output of the converting circuit 10. When the direct-current voltage DC1 is higher than a value V2 that is higher than the value V1, the detecting circuit 28 outputs a detection signal DETS3. Operations of the detecting circuit 28 are described with reference to FIG. 5.

The switching circuit 20A connects a direct-current voltage line DC3 to a direct-current voltage line DC5 in response to the output of the detection signal DETS1. When the switching circuit 20A receives the detection signal DETS1 and receives the detection signal DETS3 after the reception of the detection signal DETS1, the switching circuit 20A is turned off so as to disconnect the direct-current voltage line DC3 or DC4 from the direct-current voltage line DC5. When the detection signal DETS1 is output and the switching circuit 20A is turned on and receives a control signal OFF from the control circuit 26, the switching circuit 20A disconnects the direct-current voltage line DC4 from the direct-current voltage line DC5.

When the detection signal DETS2 is output, the switching circuit 22 is turned on. When the detection signal DETS2 is not output, the switching circuit 22 is turned off. When the switching circuit 22 receives the control signal OFF from the control circuit 26, the switching circuit 22 may be turned off. The functions of the switching circuit 20A and 22 may be combined and whereby the switching circuits 20A and 22 may form a single switching circuit. In this case, when the detection signals DETS1 and DETS2 are output and the single switching circuit receives the control signal OFF from the control circuit 26, the single switching circuit disconnects the direct-current voltage line DC4 from the direct-current voltage line DC5.

Figure 3:
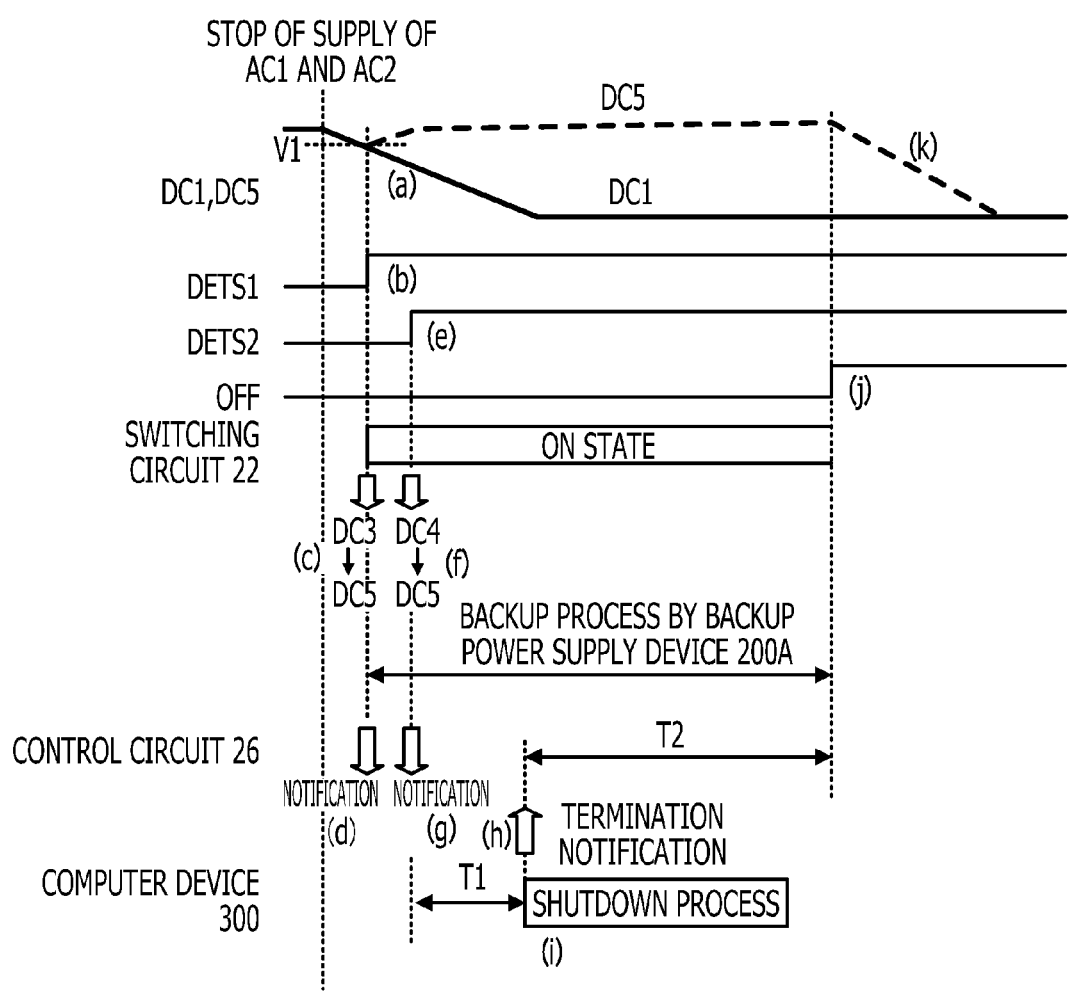
FIG. 3 is a diagram illustrating an example of operations of the backup power supply device and computer device that are illustrated in FIG. 2.

FIG. 3 is a diagram illustrating an example of operations of the backup power supply device 200A and computer device 300 that are illustrated in FIG. 2. FIG. 3 illustrates the example in which the supply of the alternating-current voltages AC1 and AC2 illustrated in FIG. 2 is stopped due to an electricity failure.

When the supply of the alternating-current voltage AC1 is stopped, the converting circuit 10 of the power supply device 100 illustrated in FIG. 2 does not newly generate a direct-current voltage DC1, and the direct-current voltage DC1 is gradually reduced ((a) illustrated in FIG. 3). The detecting circuit 14 illustrated in FIG. 2 detects that the direct-current voltage DC1 is equal to or lower than the value V1. The detecting circuit 14 illustrated in FIG. 2 sets the detection signal DETS1 to the active level (for example, high level) ((b) illustrated in FIG. 3). The switching circuit 22 is turned on in response to the detection signal DETS1 and supplies, as the direct-current voltage DC5, the direct-current voltage DC3 received from the converting circuit 16 to the power supply device 100 ((c) illustrated in FIG. 3). Specifically, the backup process is started for the power supply by the backup power supply device 200A. The control circuit 26 receives the detection signal DETS1 and notifies the computer device 300 of information indicating the stop of the supply of the alternating-current voltage AC1 through the communication interface CIF ((d) illustrated in FIG. 3).

The detecting circuit 24 detects the stop of the supply of the alternating-current voltage AC2 and sets the detection signal DETS2 to an active level (for example, high level) ((e) illustrated in FIG. 3). The switching circuit 22 disconnects the direct-current voltage line DC3 from the direct-current voltage line DC5 and connects the direct-current voltage line DC4 to the direct-current voltage line DC5 in response to the detection signal DETS2 ((f) illustrated in FIG. 3). Thus, even when the supply of the alternating-current voltage AC2 is stopped, the direct-current voltage DC5 is supplied to the power supply device 100 from the battery 18. The control circuit 26 receives the detection signal DETS2 and notifies the computer device 300 of information indicating the stop of the supply of the alternating-current voltage AC2 through the communication interface CIF ((g) illustrated in FIG. 3).

The detecting circuit 24 detects a reduction in the alternating-current voltage AC2. Thus, before the direct-current voltage DC3 is reduced due to the stop of the supply of the alternating-current voltage AC2, the switching circuit 22 may be turned on and the battery 18 may supply the direct-current voltage DC4 to the power supply device 100. Thus, the direct-current voltage DC5 may be supplied to the power supply device 100 without being reduced after a reduction in the direct-current voltage DC1, and the converting circuit 12 may generate a stable direct-current voltage DC2.

The computer device 300 detects, on the basis of the information notified by the control circuit 26, that the supply of the alternating-current voltages AC1 and AC2 has been stopped. Then, the computer device 300 outputs a termination notification to the control circuit 26 after a time period T1 ((h) illustrated in FIG. 3). For example, the time period T1 is set to a value in a range of several hundreds of milliseconds to several seconds. The computer device 300 starts the shutdown process after the time period T1 ((i) illustrated in FIG. 3). The shutdown process is not executed when the supply of the alternating-current voltage AC1 is stopped, or when only a system for the direct-current voltage DC1 is stopped due to a failure of the converting circuit 10, or when the supply of the alternating-current voltage AC2 is stopped, or when a system for the direct-current voltage DC3 is stopped due to a failure of the converting circuit 16. Thus, the shutdown process may be inhibited from being executed in an undesirable manner, and an operational efficiency and reliability of the computer device 300 may be improved.

Figure 5:
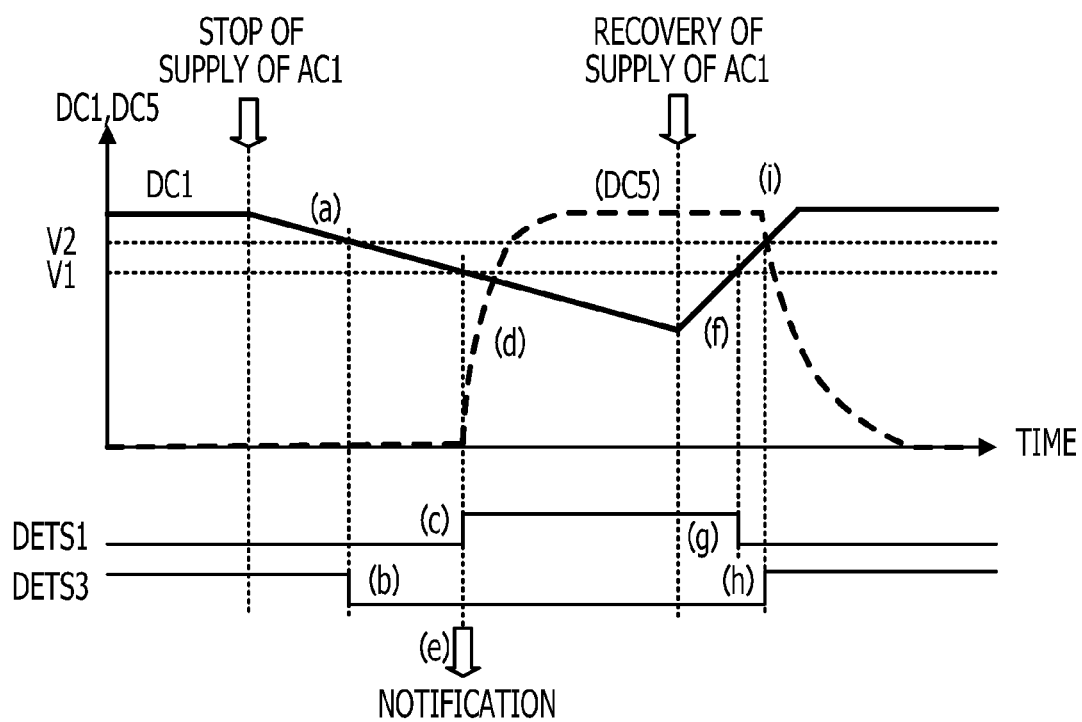
FIG. 5 is a diagram illustrating an example of operations that are executed by the backup power supply device illustrated in FIG. 2 when generation of a direct voltage is stopped for a predetermined time period.

When the computer device 300 receives a notification indicating recovery of the supply of the alternating-current voltage AC1 or AC2 from the control circuit 26 before the time period T1 elapses, the computer device 300 does not issue the termination notification and does not execute the shutdown process. Providing the time period T1 inhibits the computer device 300 from starting the shutdown process when the direct-current voltage DC1 is temporarily reduced due to temporary stop of the supply of the alternating-current voltage AC1. In addition, providing the time period T1 improves the operational efficiency and reliability of the computer device 300. Operations that are executed when the generation of the direct-current voltage DC1 is recovered after the generation of the direct-current voltage DC1 is stopped for a predetermined time period are illustrated in FIG. 5.

After the control circuit 26 receives the termination notification from the computer device 300, the control circuit 26 outputs, to the switching circuit 22, a control signal OFF that causes the switching circuit 22 to be turned off after a time period T2 ((j) illustrated in FIG. 3). The time period T2 is obtained by adding a certain time period to a period of time to complete the shutdown process. For example, the time period T2 is several minutes. The time period T2 is set in a memory or register that is included in the control circuit 26 or the like. The switching circuit 22 is turned off in response to the control signal OFF output from the control circuit 26 and releases the connection of the switching circuit 22 to the battery 18 regardless of whether or not the detection signal DETS2 is output. Thus, the switching circuit 22 stops the supply of the direct-current voltage DC5 to the power supply device 100 ((k) illustrated in FIG. 3). Draining of the battery 18 during the stop of the supply of the alternating-current voltage AC2 may be suppressed by disconnecting an output of the battery 18 from all loads including the direct-current voltage line DC5 after the shutdown process.

Figure 4:
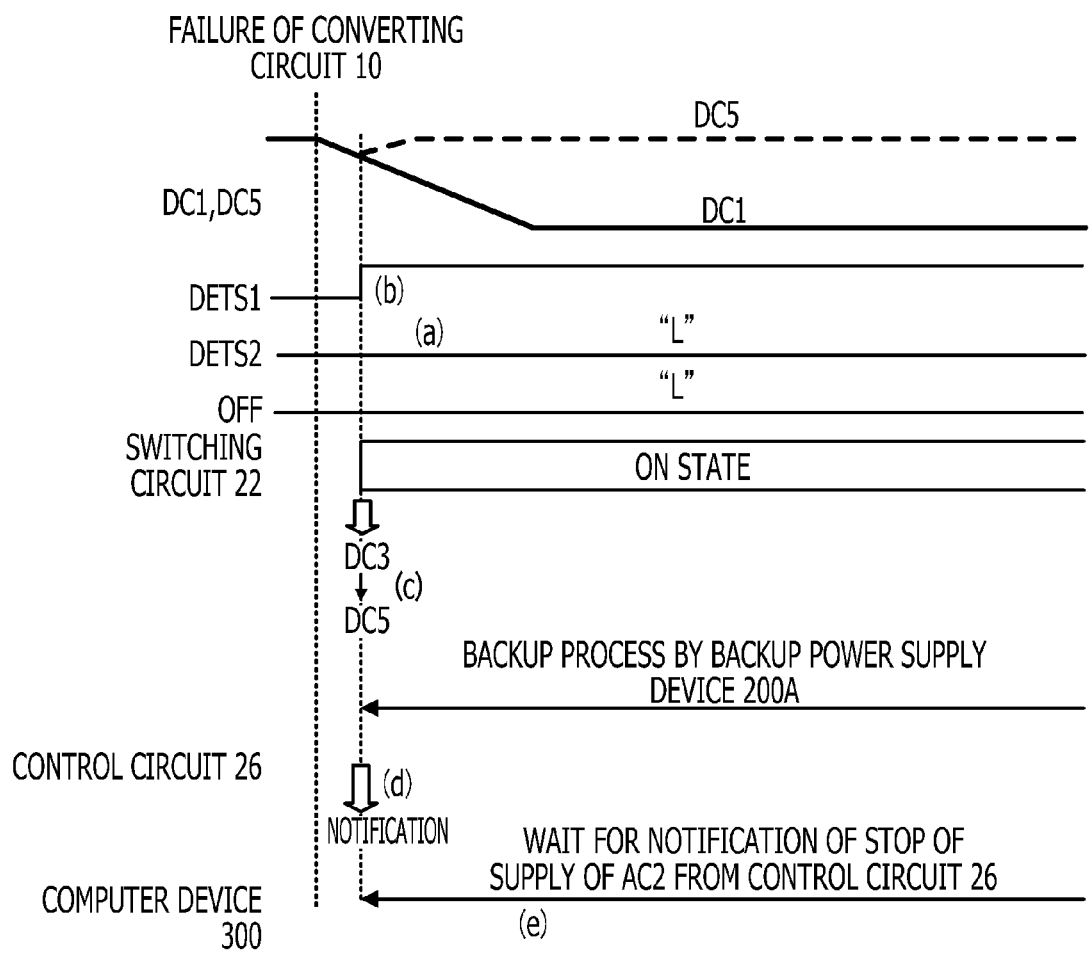
FIG. 4 is a diagram illustrating another example of operations of the backup power supply device and computer device that are illustrated in FIG. 2.

FIG. 4 is a diagram illustrating another example of operations of the backup power supply device 200A and computer device 300 that are illustrated in FIG. 2. FIG. 4 illustrates the example in which the generation of the direct-current voltage DC1 is stopped due to a failure of the converting circuit 10 of the power supply device 100. Operations that are executed when the supply of the alternating-current voltage AC1 is stopped and the alternating-current voltage AC2 is continuously supplied to the backup power supply device 200A are the same as those illustrated in FIG. 4.

If the converting circuit 10 fails, the supply of the alternating-current voltage AC2 is not stopped. Thus, the detecting circuit 24 illustrated in FIG. 2 maintains the detection signal DETS2 at an inactive level (for example, low level "L") ((a) illustrated in FIG. 4). The converting circuit 16 receives the alternating-current voltage AC2 and continuously generates the direct-current voltage DC3 so as to maintain a charged state of the battery 18. The detecting circuit 14 detects a reduction in the direct-current voltage DC1 and sets the detection signal DETS1 to the active level (for example, high level) in the same manner as illustrated in FIG. 3 ((b) illustrated in FIG. 4).

After that, the switching circuit 22 supplies, as the direct-current voltage DC5, the direct-current voltage DC3 to the power supply device 100 in response to the detection signal DETS1 in the same manner as illustrated in FIG. 3 ((c) illustrated in FIG. 4). The control circuit 26 notifies the computer device 300 of information indicating the stop of the supply of the alternating-current voltage AC1 ((d) illustrated in FIG. 4). The computer device 300 waits for a notification indicating the stop of the supply of the alternating-current voltage AC2 ((e) illustrated in FIG. 4), while the notification is transmitted by the control circuit 26. Specifically, the computer device 300 does not start the shutdown process until receiving both notification indicating the stop of the supply of the alternating-current voltage AC1 and notification indicating the stop of the supply of the alternating-current voltage AC2. In other words, the computer device 300 is not stopped when the direct-current voltage DC3 or DC4 that is generated by the backup power supply device 200A is supplied to the converting circuit 12 of the power supply device 100. Thus, a time period in which the computer device 300 operates may be long, and the reliability of the computer device 300 may be improved.

FIG. 5 is a diagram illustrating an example of operations of the backup power supply device 200A illustrated in FIG. 2 when the generation of the direct-current voltage DC1 is stopped for a predetermined time period. In FIG. 5, in order to easily understand a description of the example, a thick dashed line "DC5" indicates a waveform (not including any component of the direct-current voltage DC1) of the direct-current voltage DC5 when an output of the switching circuit 22 is not coupled to the power supply device 100. As described above, the direct-current voltage DC1 is temporarily reduced when the generation of the direct-current voltage DC1 is temporarily stopped due to temporary stop of the supply of the alternating-current voltage AC1.

When the supply of the alternating-current voltage AC1 is stopped, the converting circuit 10 stops generating the direct-current voltage DC1 and whereby the direct-current voltage DC1 is gradually reduced ((a) illustrated in FIG. 5). When the direct-current voltage DC1 is equal to or lower than the value V2, the detecting circuit 28 sets the detection signal DETS3 to an inactive level (for example, low level) ((b) illustrated in FIG. 5). After that, when the direct-current DC1 is equal to or lower than the value V1, the detection signal DETS1 is changed to the active level in the same manner as illustrated in FIG. 3. Then, the switching circuit 22 outputs the direct-current voltage DC3 as the direct-current voltage DC5 ((c, d) illustrated in FIG. 5). The control circuit 26 notifies the computer device 300 of information indicating the stop of the supply of the alternating-current voltage AC1 in response to the detection signal DETS1 ((e) illustrated in FIG. 5).

After that, when the supply of the alternating-current voltage AC1 is recovered, the converting circuit 10 starts generating the direct-current voltage DC1 so as to increase the direct-current voltage DC1 ((f) illustrated in FIG. 5). When the direct-current voltage DC1 exceeds the value V1, the detecting circuit 14 sets the detection signal DETS1 to the inactive level ((g) illustrated in FIG. 5). When the direct-current voltage DC1 exceeds the value V2, the detecting circuit 28 sets the detection signal DETS3 to an active level (for example, high level) ((h) illustrated in FIG. 5). The direct-current voltage DC3 that is generated by the converting circuit 16 of the backup power supply device 200A is continuously supplied as the direct-current voltage DC5 to the input of the converting circuit 12 of the power supply device 100 until the detection signal DETS3 is changed to the active level. The switching circuit 22 stops outputting the direct-current voltage DC3 to the direct-current voltage line DC5 in response to the active level of the detection signal DETS3 ((i) illustrated in FIG. 5).

A reduction in a direct-current voltage (obtained by combining the direct-current voltage DC1 with the direct-current voltage DC3 or DC4) to be supplied to the converting circuit 12 may be suppressed by continuously supplying the direct-current voltage DC3 or DC4 to the converting circuit 12 until the direct-current voltage DC1 becomes higher than the value V2 after the recovery of the supply of the alternating-current voltage AC1. As a result, the direct-current voltage DC2 may be stably generated by the converting circuit 12 even when the generation of the direct-current voltage DC1 is temporarily stopped due to temporary stop of the supply of the alternating-current voltage AC1. The amount of power to be consumed by the converting circuit 12 to generate direct-current voltages DC2 of multiple types is larger than the amount of power to be consumed by the converting circuit 12 to generate a direct-current voltage of one type. Thus, it is preferable that the amount of a reduction in the direct-current voltage to be input to the converting circuit 12 be small.

The direct-current voltage DC1 may be gradually reduced to a value that is close to the value V1 due to the stop of the supply of the alternating-current voltage AC1. Then, the direct-current voltage DC1 may repeatedly change to a higher value than the value V1 and a lower value than the value V1. In this case, the switching circuit 22 may be inhibited from being repeatedly turned on and off (or inhibit the direct-current voltage line DC3 or DC4 from being repeatedly coupled to the direct-current voltage line DC5 and disconnected from the direct-current voltage line DC5) by turning off the switching circuit 22 in response to the active level of the detection signal DETS3. Thus, the occurrence of noise in the direct-current voltage line DC5 may be suppressed. In addition, an increase in the amount of power to be consumed may be suppressed, while the increase is caused by the repetition of the turning on and off of the switching circuit 22.

Thus, in the present embodiment, effects that are the same as or similar to those obtained in the first embodiment may be obtained. In addition, the shutdown process may be executed between the backup power supply device 200A and the computer device 300 through the communication interface CIF. Draining of the battery 18 after the shutdown process may be suppressed. As a result, the operational efficiency and reliability of the computer device 300 may be improved.

For example, if the computer device 300 starts the shutdown process when the supply of the alternating-current voltages AC1 and AC2 is stopped, the shutdown process may be inhibited from being executed in an undesirable manner. For example, when the supply of one of the alternating-current voltages AC1 and AC2 is stopped, the shutdown process is not executed. By providing the time period T1, the shutdown process may be inhibited from being executed when the supply of one of the alternating-current voltages AC1 and AC2 is temporarily stopped during the stop of the other of the alternating-current voltages AC1 and AC2 or when the supply of the direct-current voltage DC1 is temporarily stopped.

The output of the battery 18 may be disconnected from all the loads including the direct-current voltage line DC5 after the shutdown process by providing the time period T2 obtained by adding the certain time period to the period of time to complete the shutdown process. Draining of the battery 18 during the stop of the supply of the alternating-current voltage AC2 may be suppressed. As a result, the computer device 300 may be reliably activated using the battery 18 after recovery of the supply of the alternating-current voltage AC2.

Figure 6:
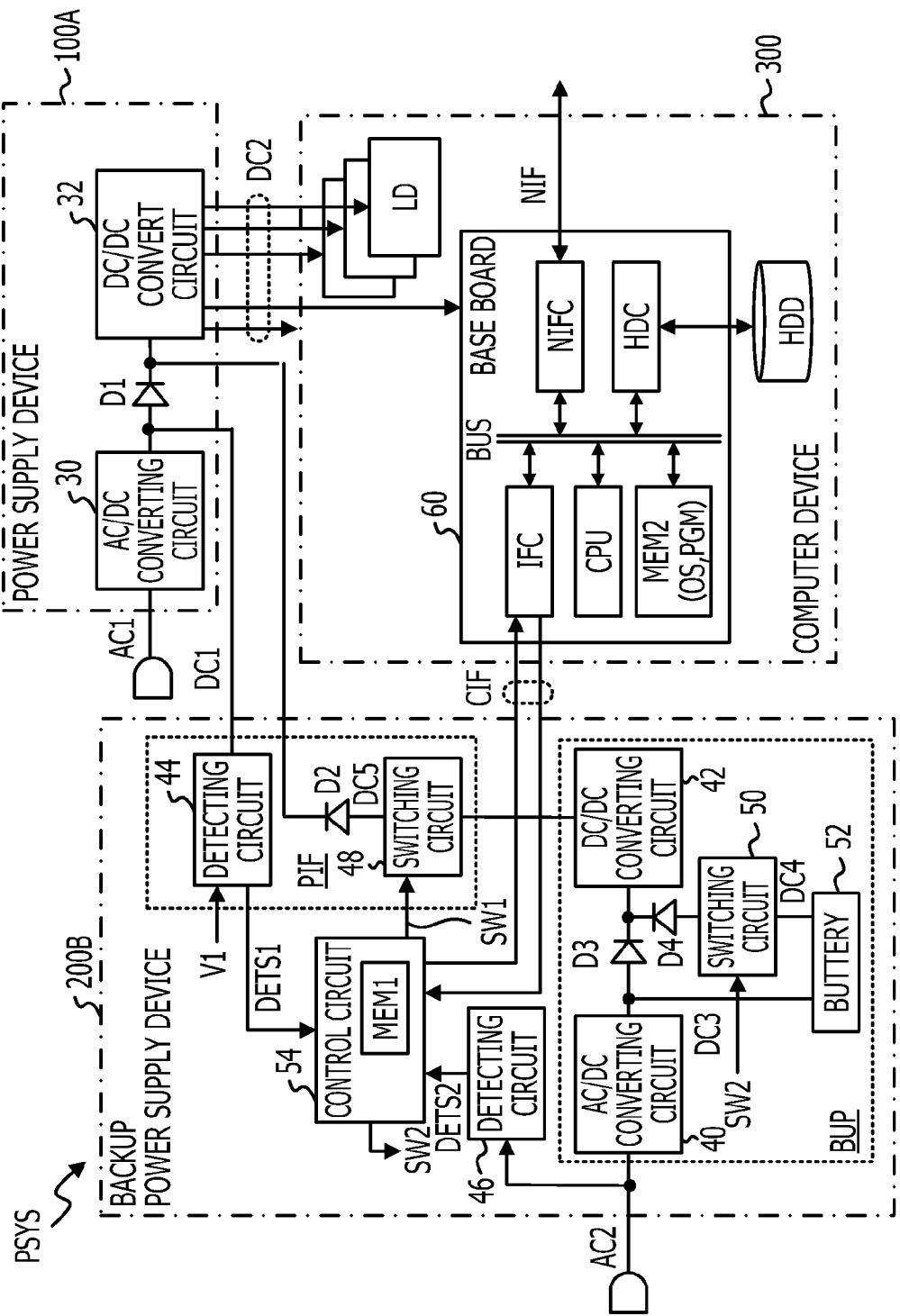
FIG. 6 is a diagram illustrating an example of a backup power supply device, a power supply system and a computer system according to the third embodiment.

FIG. 6 is a diagram illustrating an example of a backup power supply device, a power supply system and a computer system according to the third embodiment. In the third embodiment, parts that are the same as those described in the first and second embodiments are indicated by the same reference numerals and symbols as those described in the first and second embodiments, and a detailed description thereof is omitted.

In the present embodiment, a power supply system PSYS includes a power supply device 100A and a backup power supply device 200B in a similar manner to the power supply system PSYS illustrated in FIG. 2. A computer system includes the power supply device 100A, the backup power supply device 200B and the computer device 300. The alternating-current voltages AC1 and AC2 are supplied from the common power supply such as the commercial power supply in the same manner as illustrated in FIGS. 1 and 2. The alternating-current voltages AC1 and AC2 may be supplied from two alternating-current power supplies, respectively. In this case, the two alternating-current power supplies are independent of each other.

The power supply device 100A is a normal power supply that operates when the system normally operates. The power supply device 100A includes an alternating current-to-direct current converting circuit (AC/DC converting circuit) 30 and a direct-current-to-direct current converting circuit (DC/DC converting circuit) 32. The AC/DC converting circuit 30 corresponds to the converting circuit 10 illustrated in FIG. 1. The DC/DC converting circuit 32 corresponds to the converting circuit 12 illustrated in FIG. 1. Other configurations of the power supply device 100A are the same as the power supply device 100 illustrated in FIG. 1.

The AC/DC converting circuit 30 converts the alternating-current voltage AC1 into a direct-current voltage DC1. The AC/DC converting circuit 32 converts the direct-current voltage DC1 into direct-current voltages DC2 of multiple types. For example, the direct-current voltages DC2 are of four types, 12 V, 5 V, 3.3 V and 1.5 V. The direct-current voltages DC2 are supplied to loads LD and a hard disk device HDD that are included in the computer device 300. For example, the loads LD are printed boards that each have an analog circuit or digital circuit mounted thereon.

The backup power supply device 200B includes an AC/DC converting circuit 40, a DC/DC converting circuit 42, detecting circuits 44, 46, switching circuits 48, 50, a battery 52, a control circuit 54 and diodes D2, D3, D4. The detecting circuit 44, the switching circuit 48 and the diode D2 function as a power supply interface PIF. The AC/DC converting circuit 40, the DC/DC converting circuit 42, the switching circuit 50, the battery 52 and the diodes D3, D4 function as a backup section BUP.

The power supply interface PIF is described below. The detecting circuit 44 outputs the detection signal DETS1 when the direct-current voltage DC1 (of, for example, 12 V during a normal operation) that is generated by the AC/DC converting circuit 30 is lower than a reference voltage V1 (of, for example, 11 V). The reference voltage V1 is generated in the backup power supply device 200B using a direct-current voltage generated by the DC/DC converting circuit 42, for example. For example, when the direct-current voltage DC1 is lower than the reference voltage V1, the detecting circuit 44 sets the detection signal DETS1 to the active level. When the direct-current voltage DC1 is equal to or higher than the reference voltage V1, the detecting circuit 44 sets the detection signal DETS1 to the inactive level. The detecting circuit 44 corresponds to the detecting circuit 14 illustrated in FIGS. 1 and 2.

When a control signal SW1 supplied from the control circuit 54 is at an active level, the switching circuit 48 is turned on so as to supply the direct-current voltage received from the DC/DC converting circuit 42 to an input of the DC/DC converting circuit 32 through the diode D2. When the control signal SW1 is at an inactive level, the switching circuit 48 is turned off so as to release a connection of an output of the DC/DC converting circuit 42 to the DC/DC converting circuit 32. The diode D2 inhibits the direct-current voltage DC1 generated by the AC/DC converting circuit 30 from being supplied to the DC/DC converting circuit 42 through the switching circuit 48. The diode D2 may not be arranged if the switching circuit 48 is turned off for a time period in which the AC/DC converting circuit 30 operates.

The detecting circuit 46 corresponds to the detecting circuit 24 illustrated in FIG. 2. The detecting circuit 46 sets the detection signal DETS2 to the active level when the supply of the alternating-current voltage AC2 is stopped. The detecting circuit 46 sets the detection signal DETS2 to the inactive level when receiving the alternating-current voltage AC2.

The backup section BUP is described below. The AC/DC converting circuit 40 converts the alternating-current voltage AC2 into the direct-current voltage DC3 (of, for example, 24 V) and supplies the direct-current voltage DC3 to the DC/DC converting circuit 42 through the diode D3. The AC/DC converting circuit 40 corresponds to the converting circuit 16 illustrated in FIGS. 1 and 2. The DC/DC converting circuit 42 converts the direct-current voltage DC3 generated by the AC/DC converting circuit 40 into a direct-current voltage that is equal or nearly equal to the direct-current voltage DC1. Then, the DC/DC converting circuit 42 outputs the converted direct-current voltage to the switching circuit 48. When the direct-current voltage DC3 that is generated by the AC/DC converting circuit 40 is equal to the direct current voltage DC1, the DC/DC converting circuit 42 may not be arranged.

When a control signal SW2 supplied from the control circuit 54 to the switching circuit 50 is at an active level, the switching circuit 50 is turned on so as to cause the direct-current DC4 to be supplied from the battery 52 through the diode D4 to an input of the DC/DC converting circuit 42. The direct-current voltage DC4 is equal or nearly equal to the direct-current voltage DC3. When the control signal SW2 is at an inactive level, the switching circuit 50 is turned off so as to release a connection of the output of the battery 52 to the DC/DC converting circuit 42. When the detection signal DETS2 is at the active level, the control signal SW2 is set to the active level. Specifically, when the supply of the alternating-current voltage AC2 is stopped, the switching circuit 50 is turned on so as to cause the direct-current voltage DC4 to be supplied from the battery 52 to the DC/DC converting circuit 42.

The battery 52 corresponds to the battery 18 illustrated in FIGS. 1 and 2. The battery 52 receives the direct-current voltage DC3 and is thereby charged so as to accumulate electric charges. The battery 52 outputs the accumulated electric charges as the direct-current voltage DC4 to the direct-current voltage line DC4. When the supply of the alternating-current voltage AC2 is stopped, the diode D3 inhibits the direct-current voltage DC4 output from the battery 52 from returning to an input of the battery 52. The diode D4 inhibits the direct-current voltage DC3 output from the AC/DC converting circuit 40 from being supplied to the output of the battery 52. The diode D4 may not be arranged when the switching circuit 50 is turned off for a time period in which an operation of the AC/DC converting circuit 40 operates.

The control circuit 54 corresponds to the control circuit 26 illustrated in FIG. 2. The control circuit 54 has a function of communicating with the computer device 300 through the communication interface CIF. For example, the control circuit 54 is a microcontroller that has a read only memory (ROM) therein. The control circuit 54 executes a program stored in the ROM, thereby detects the levels of the detection signals DETS1 and DETS2, outputs the control signals SW1 and SW2 and communicates with the computer device 300.

The control circuit 54 generates the control signal SW1 on the basis of the detection signal DETS1 and generates the control signal SW2 on the basis of the detection signal DETS2. The control circuit 54 includes a memory MEM1 that stores information indicating a time period T2 illustrated in FIG. 7. The memory MEM1 is a nonvolatile storage device such as a flash memory, a ROM, a fuse or a DIP switch. Operations of the control circuit 54 are described with reference to FIGS. 7 to 12.

The backup power supply device 200B may have the detecting circuit 28 that outputs the detection signal DETS3 to the control circuit 54 when the direct-current voltage DC1 is higher than a value V2 that is higher than the reference voltage V1 in a similar manner to the backup power supply device 200A illustrated in FIG. 2. In this case, the control circuit 54 operates in a similar manner to the operations illustrated in FIG. 5.

The computer device 300 includes a base board 60, the hard disk device HDD and the aforementioned loads LD. For example, the base board 60 includes a processor CPU, a communication interface circuit IFC, a memory MEM2, a network interface circuit NIFC and a hard disk control circuit HDC, which are coupled to each other through a bus BUS. The processor CPU manages operations of the overall computer device 300. The processor CPU communicates with the control circuit 54 of the backup power supply device 200B and thereby executes backup control of the power supply. The computer device 300 may have a display device, an input device and a speaker.

The communication interface circuit IFC operates in accordance with a power supply control program PGM executed by the processor CPU. The communication interface circuit IFC has a function of receiving information output from the control circuit 54 and transmitting, to the control circuit 54, information that is used to control the backup power supply device 200B.

The memory MEM2 stores an operating system OS to be executed by the processor CPU, the power supply control program PGM and a management program to be used to manage the computer device 300. The power supply control program PGM is executed in order to control an operation of the backup power supply device 200B.

The network interface circuit NIFC operates in accordance with the management program executed by the processor CPU. The network interface circuit NIFC has a function of communicating with an external device of the computer device 300 through a network interface NIF. For example, a local area network (LAN) is used as the network interface NIF.

The hard disk control circuit HDC is controlled by the management program executed by the processor CPU and a direct memory access controller (DMAC) (not illustrated) coupled to the bus BUS. The hard disk control circuit HDC writes data in the hard disk device HDD and reads data from the hard disk device HDD.

Figure 7:
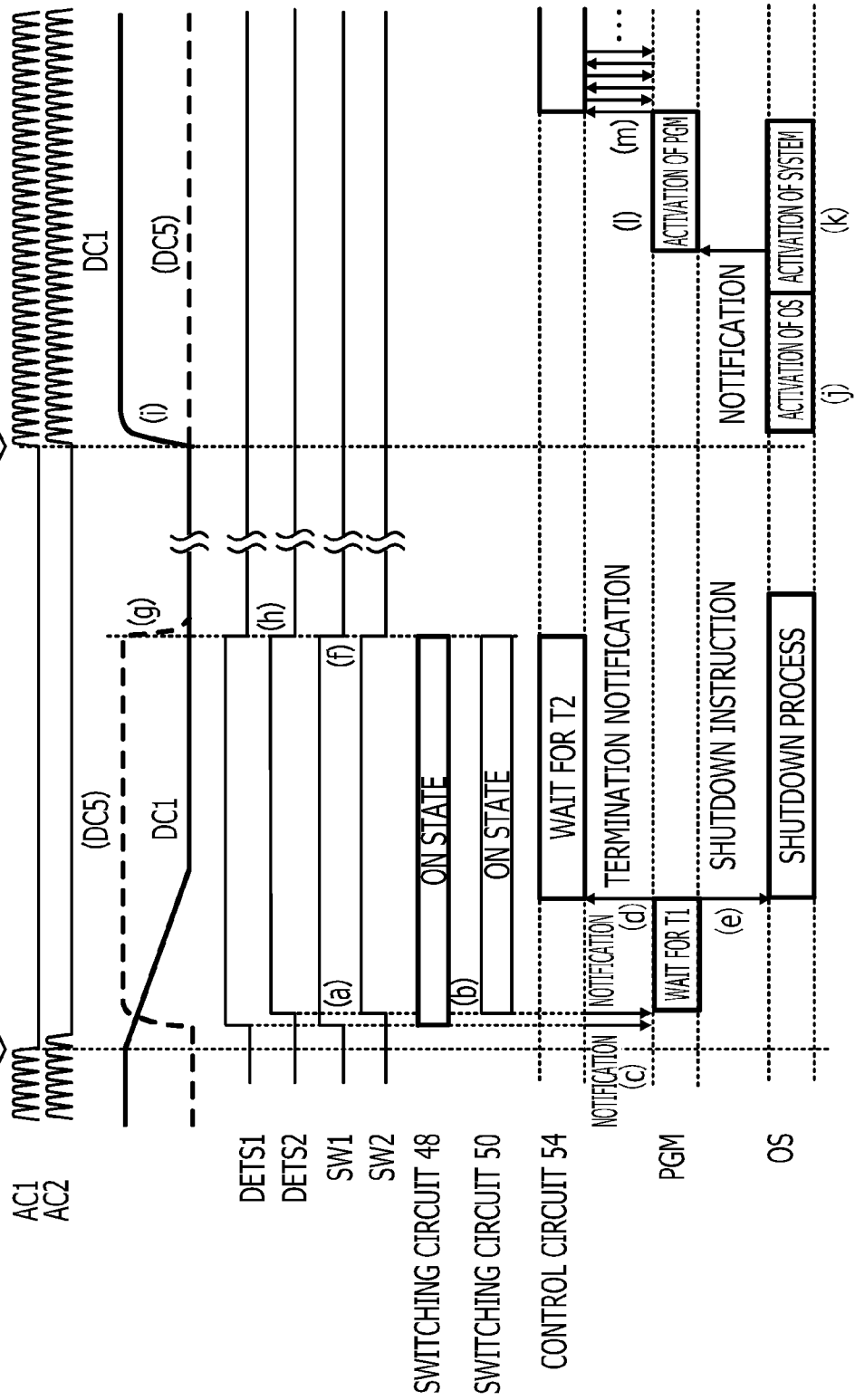
FIG. 7 is a diagram illustrating an example of operations of the backup power supply device and computer device that are illustrated in FIG. 6.

FIG. 7 is a diagram illustrating an example of operations of the computer system illustrated in FIG. 6. Specifically, FIG. 7 illustrates the example of the operations of the backup power supply device 200B, power supply system PSYS and computer device 300 that are illustrated in FIG. 6. A detailed description of the same operations as illustrated in FIG. 3 is omitted. FIG. 7 illustrates operations to be executed in the example in which the supply of the alternating-current voltages AC1 and AC2 are nearly simultaneously stopped and nearly simultaneously recovered.

When the supply of the alternating-current voltages AC1 and AC2 is stopped (due to an electricity failure), the control circuit 54 sets the control signals SW1 and SW2 to the active levels (for example, high levels) in response to changes of the detection signals DETS1 and DETS2 to the active levels ((a) illustrated in FIG. 7). Thus, the switching circuits 48 and 50 are turned on so as to cause the direct-current voltage DC5 to be supplied to the power supply device 100A ((b) illustrated in FIG. 7). In FIG. 7, an "ON state" that is described in a thick frame indicating the state of the switching circuit 48 indicates that the direct-current voltage DC5 is supplied to an input of the DC/DC converting circuit 32 of the power supply device 100A. The thick frame indicates a time period in which the power is supplied by the backup power supply device 200B as a backup for the power supply device 100A.

The control circuit 54 sequentially notifies the power supply control program PGM of information indicating the stop of the supply of the alternating-current voltages AC1 and AC2 through the communication interface CIF illustrated in FIG. 6 ((c) illustrated in FIG. 7). After the power supply control program PGM that is executed by the processor CPU detects that the supply of the alternating-current voltages AC1 and AC2 is stopped, the power supply control program PGM waits for the time period T1 in a similar manner to FIG. 3. If the power supply control program PGM does not receive a notification indicating recovery of the supply of the alternating-current voltage AC1 or AC2 from the control circuit 54 within the time period T1, the power supply control program PGM detects the electricity failure, outputs a termination notification to the control circuit 54 ((d) illustrated in FIG. 7) and instructs the operating system OS to start the shutdown process ((e) illustrated in FIG. 7). When the shutdown process of the operating system OS is started, the power supply control program PGM is not executed. Thus, it is desirable that the control circuit 54 receive the termination notification before the shutdown process is started.

The operating system OS completes the shutdown process after the time period T1 elapses and before the time period T2 elapses. The power supply control program PGM starts a process after the time period T1 and completes the process before the time period T2 elapses, while the process is to be executed before the power supply is interrupted. Thus, the operating system OS and the power supply control program PGM do not suspend the processes even if the power supply is interrupted after the time period T2. The reliability of the computer device 300, therefore, may be improved.

After receiving the termination notification from the power supply control program PGM, the control circuit 54 waits for the time period T2 in the same manner as FIG. 3 and sets the control signals SW1 and SW2 to the inactive levels (for example, low levels) in order to turn off the switching circuits 48 and 50 after the time period T2 ((f) illustrated in FIG. 7). Thus, the supply of the direct-current voltage DC5 to the power supply device 100A is stopped ((g) illustrated in FIG. 7). In response to the termination notification, the control circuit 54 stops the detecting circuit 44 from detecting the direct-current voltage DC1 and the detecting circuit 46 from detecting the alternating-current voltage AC2. The detection signals DETS1 and DETS2 are changed to the inactive levels due to the stop of the detecting circuits 44 and 46 ((h) illustrated in FIG. 7).

After that, the backup power supply device 200B stops operations of the circuits other than the control circuit 54 until the supply of the alternating-current voltages AC1 and AC2 is recovered from the electricity failure and the backup power supply device 200B receives an instruction from the power supply control program PGM. The control circuit 54 operates using the voltage supplied from the battery 52 for a time period in which the alternating-current voltage AC2 is not supplied. The amount of power to be consumed by the backup power supply device 200B may be suppressed by stopping the operations of the circuits other than the control circuit 54 for the time period in which the electricity fails. Thus, draining of the battery 52 may be suppressed.

After the recovery of the supply of the alternating-current voltages AC1 and AC2, the AC/DC converting circuit 40 of the backup power supply device 200B starts generating the direct-current voltage DC3 and starts charging the battery 52.

The AC/DC converting circuit 30 of the power supply device 100A starts generating the direct-current voltage DC1 ((i) illustrated in FIG. 7). The processor CPU executes a power-on sequence in response to an increase in the direct-current voltage DC2 generated by the DC/DC converting circuit 32 and activates the operating system OS ((j) illustrated in FIG. 7).

The activated operating system OS activates a system program (application program) that is used to operate the computer device 300 as a system ((k) illustrated in FIG. 7). The system program instructs the power supply control program PGM to be activated ((l) illustrated in FIG. 7). The activated power supply control program PGM starts communication with the control circuit 54 ((m) illustrated in FIG. 7). For example, the power supply control program PGM periodically detects a notification transmitted from the control circuit 54 for the next electricity failure. The periodic detection may be executed using a command issued by the control circuit 54, a packet issued by the control circuit 54 or polling. The periodic detection may be executed on the basis of an interrupt request transmitted by the control circuit 54.

Figure 8:
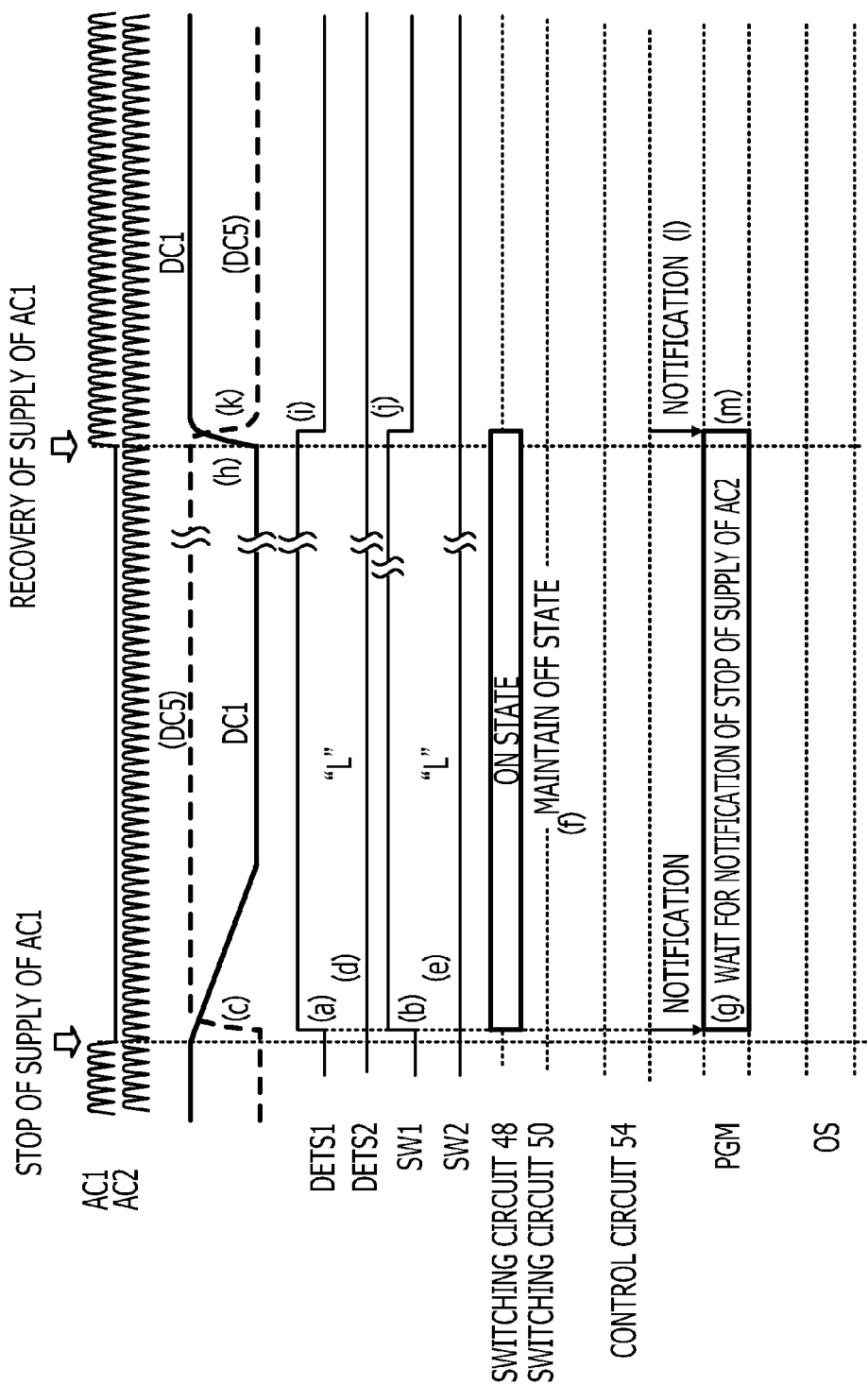
FIG. 8 is a diagram illustrating another example of the operations of the backup power supply device and computer device that are illustrated in FIG. 6.

FIG. 8 is a diagram illustrating another example of operations of the computer system illustrated in FIG. 6. Specifically, FIG. 8 illustrates the other example of the operations of the backup power supply device 200B, power supply system PSYS and computer device 300 that are illustrated in FIG. 6. A detailed description of the same operations as those illustrated in FIGS. 3 and 7 is omitted. FIG. 8 illustrates operations to be executed in the example in which the supply of the alternating-current voltage AC1 is stopped and the supply of the alternating-current voltage AC2 is not stopped.

First, due to the stop of the supply of the alternating-current voltage AC1, the detection signal DETS1 is changed to the active level ((a) illustrated in FIG. 8) and the control signal SW1 is changed to the active level ((b) illustrated in FIG. 8). Thus, the switching circuit 48 is turned on so as to cause the direct-current voltage DC5 to be supplied to the power supply device 100A ((c) illustrated in FIG. 8). Since the supply of the alternating-current voltage AC2 is not stopped, the detection signal DETS2 is maintained at the inactive level indicated by "L" ((d) illustrated in FIG. 8) and the control signal SW2 is maintained at the inactive level indicated by "L" ((e) illustrated in FIG. 8). Since the control signal SW2 is at the inactive level, the OFF state of the switching circuit 50 is maintained ((f) illustrated in FIG. 8). The DC/DC converting circuit 42 receives the direct-current voltage DC3 generated by the AC/DC converting circuit 40 and generates a direct-current voltage.

The power supply control program PGM that is executed by the processor CPU receives a notification indicating the stop of the supply of the alternating-current voltage AC1 from the control circuit 54 and waits for a notification indicating the stop of the supply of the alternating-current voltage AC2 ((g) illustrated in FIG. 8). The power supply control program PGM does not instruct the operating system OS to start the shutdown process until the power supply control program PGM detects that the supply of the alternating-current voltages AC1 and AC2 has been stopped.

After that, the supply of the alternating-current voltage AC1 is recovered without the stop of the supply of the alternating-current voltage AC2 and the generation of the direct-current voltage DC1 is started ((h) illustrated in FIG. 8). Due to the recovery of the supply of the alternating-current voltage AC1, the detection signal DETS1 is changed to the inactive level ((i) illustrated in FIG. 8) and the control signal SW1 is changed to the inactive level ((j) illustrated in FIG. 8). The switching circuit 48 is turned off in response to the inactive level of the control signal SW1 and stops the supply of the direct-current voltage DC5 to the power supply device 100A ((k) illustrated in FIG. 8).

The control circuit 54 notifies the computer device 300 (power supply control program PGM) of information (recovery notification) indicating that the detection signal DETS1 has been returned to the inactive level ((l) illustrated in FIG. 8) without a change of the detection signal DETS2 to the active level. The power supply control program PGM releases the state in which the power supply control program PGM waits for the notification indicating the stop of the supply of the alternating-current voltage AC2 ((m) illustrated in FIG. 8).

If a failure occurs between the power supply for supplying the alternating-current voltage AC1 and the AC/DC converting circuit 30 in the power supply device 100A, operations that are the same as the operations that are illustrated in FIG. 8 and are executed after the stop of the supply of the alternating-current voltage AC1 and before the recovery of the supply of the alternating-current voltage AC1 are executed. Specifically, the backup power supply device 200B and the processor CPU that executes the power supply control program PGM may detect not only the stop of the supply of the alternating-current voltage AC1 but also the failure of the power supply device 100A. Thus, an "N+1 redundant system" for the power supply device 100A may be built using the backup power supply device 200B.

For example, if the stop of the supply of the alternating-current voltage AC2 is not notified for a predetermined time period after the stop of the supply of the alternating-current voltage AC1 is notified, the power supply control program PGM may determine a failure of the AC/DC converting circuit 30 of the power supply device 100A and execute a process of outputting an alarm to the outside of the computer device 300. The alarm is output using the display device, the speaker or the network interface NIF.

Figure 9:
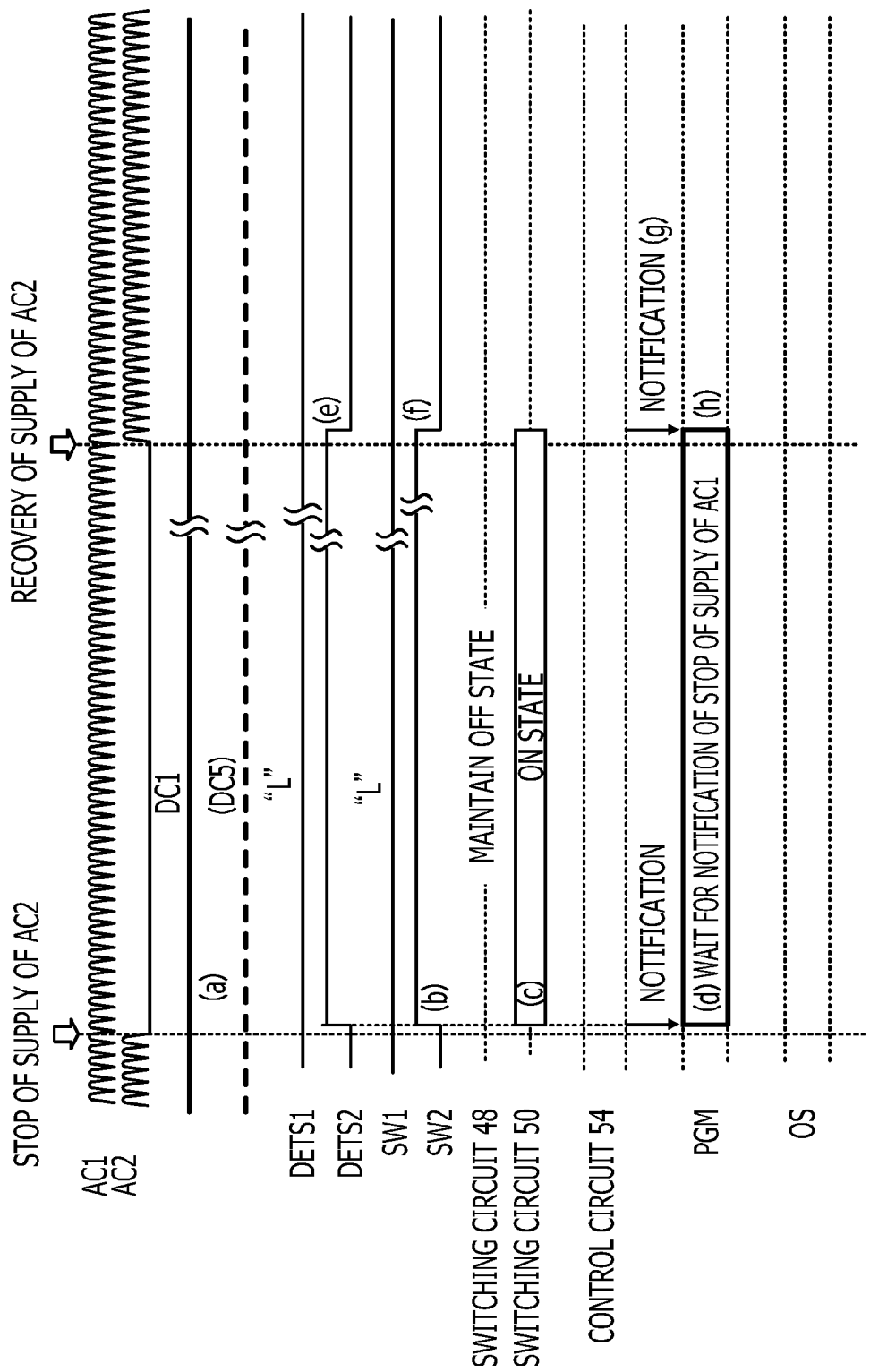
FIG. 9 is a diagram illustrating another example of the operations of the backup power supply device and computer device that are illustrated in FIG. 6.

FIG. 9 is a diagram illustrating another example of operations of the computer system illustrated in FIG. 6. Specifically, FIG. 9 illustrates the other example of the operations of the backup power supply device 200B, power supply system PSYS and computer device 300 that are illustrated in FIG. 6. A detailed description of the same operations as those illustrated in FIGS. 3, 7 and 8 is omitted. FIG. 9 illustrates operations to be executed in the example in which the supply of only the alternating-current voltage AC2 is stopped and the supply of the alternating-current voltage AC1 is not stopped, unlike the example illustrated in FIG. 8.

When the supply of the alternating-current voltage AC1 is not stopped, the AC/DC converting circuit 30 of the power supply device 100A continuously generates the direct-current voltage DC1 ((a) illustrated in FIG. 9). The control circuit 54 of the backup power supply device 200B sets the control signal SW2 to the active level ((b) illustrated in FIG. 9) in response to the active level of the detection signal DETS2 and thereby turns on the switching circuit 50 ((c) illustrated in FIG. 9).

Figure 11:
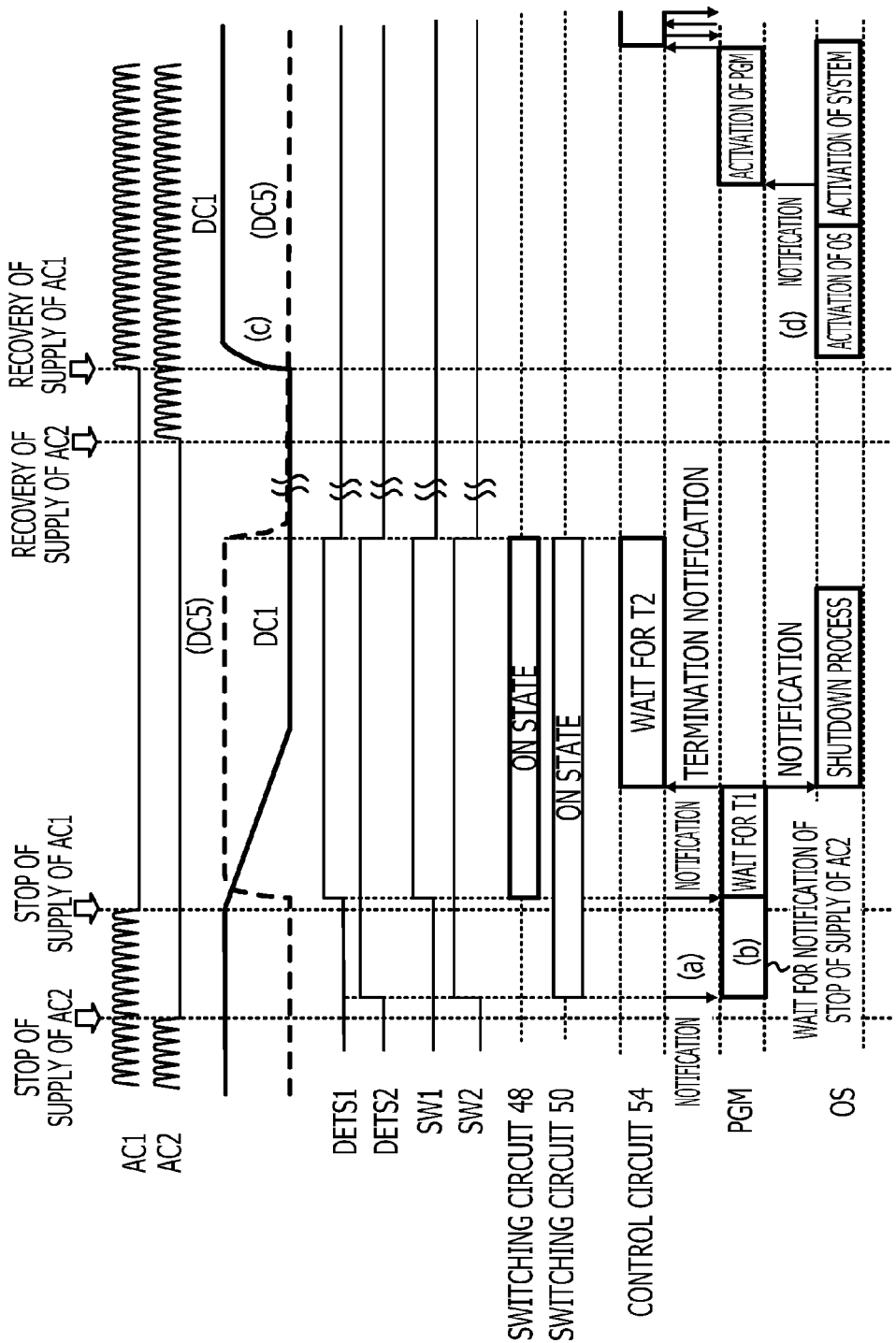
FIG. 11 is a diagram illustrating another example of the operations of the backup power supply device and computer device that are illustrated in FIG. 6.

The DC/DC converting circuit 42 receives the direct-current voltage DC4 from the battery 52 through the switching circuit 50 and generates a direct-current voltage. The DC/DC converting circuit 42 outputs the generated direct-current voltage to the switching circuit 48 in the OFF state. The switching circuit 50 is turned on in response to the stop of the supply of the alternating-current voltage AC2 and the DC/DC converting circuit 42 continuously operates. Thus, as illustrated in FIG. 11, the direct-current voltage may be supplied to the power supply device 100A immediately when the supply of the alternating-current voltage AC1 is stopped.

The power supply control program PGM that is executed by the processor CPU receives a notification indicating the stop of the supply of the alternating-current voltage AC2 from the control circuit 54 and then waits for a notification indicating the stop of the supply of the alternating-current voltage AC1 ((d) illustrated in FIG. 9). The power supply control program PGM does not instruct the operating system OS to start the shutdown process until the power supply control program PGM detects that the supply of the alternating-current voltages AC1 and AC2 has been stopped in the same manner as FIG. 8.

After that, the supply of the alternating-current voltage AC2 is recovered without the stop of the supply of the alternating-current voltage AC1, the detection signal DETS2 is changed to the inactive level ((e) illustrated in FIG. 9), and the control signal SW2 is changed to the inactive level ((f) illustrated in FIG. 9). The control circuit 54 notifies the computer device 300 (power supply control program PGM) of information (recovery notification) indicating that the detection signal DETS2 has been returned to the inactive level without a change of the detection signal DETS1 to the active level ((g) illustrated in FIG. 9). The power supply control program PGM releases the state in which the power supply control program PGM waits for a notification indicating the stop of the supply of the alternating-current voltage AC1 ((h) illustrated in FIG. 9). The switching circuit 50 is turned off in response to the inactive level of the control signal SW2. After that, the DC/DC converting circuit 42 generates a direct-current voltage using the direct-current voltage DC3 generated by the AC/DC converting circuit 40.

Figure 10:
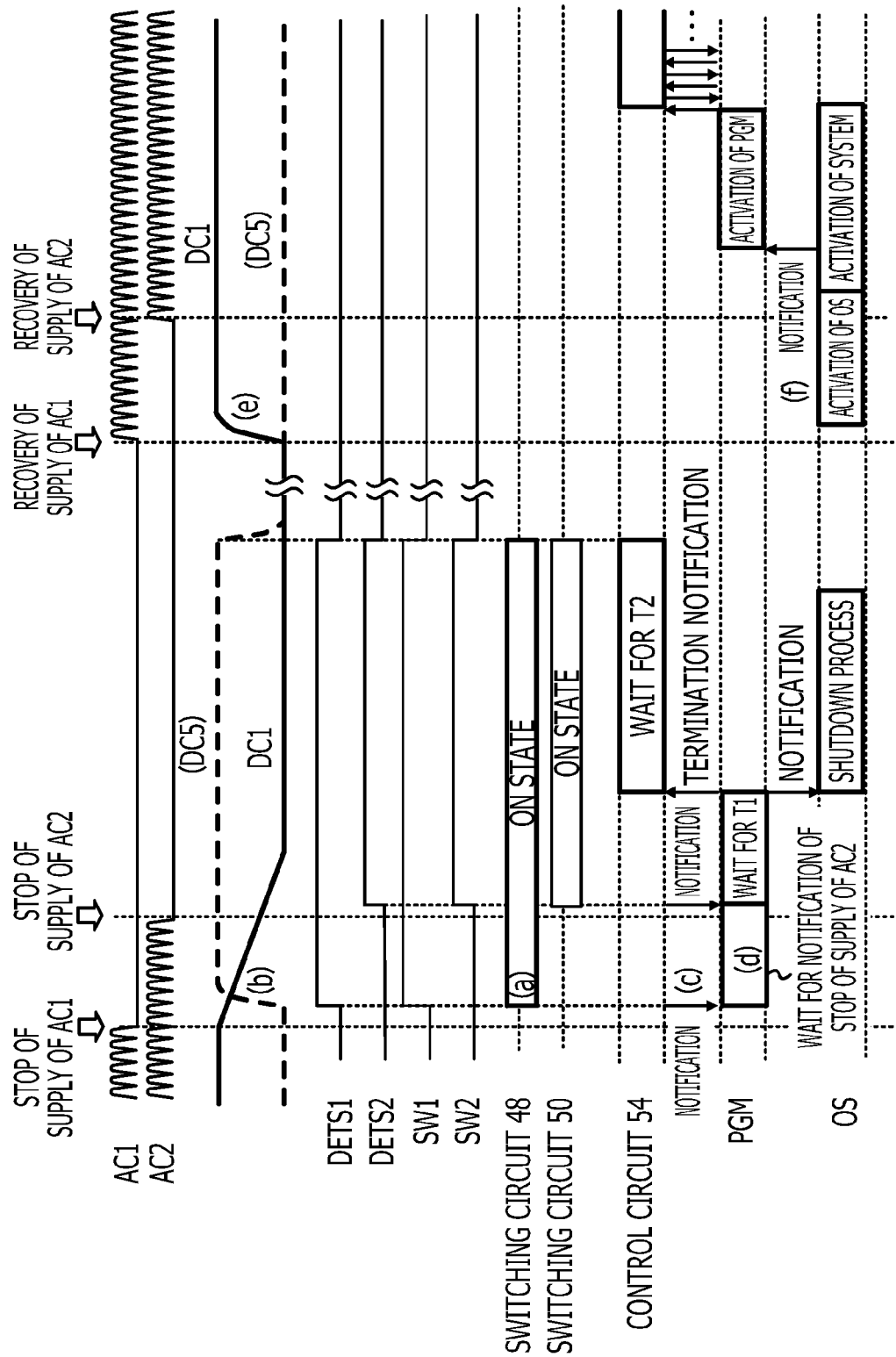
FIG. 10 is a diagram illustrating another example of the operations of the backup power supply device and computer device that are illustrated in FIG. 6.

FIG. 10 is a diagram illustrating another example of operations of the computer system illustrated in FIG. 6. Specifically, FIG. 10 illustrates the other example of the operations of the backup power supply device 200B, power supply system PSYS and computer device 300 that are illustrated in FIG. 6. A detailed description of the same operations as those illustrated in FIGS. 3 and 7 is omitted. FIG. 10 illustrates operations to be executed in the example in which the supply of the alternating-current voltage AC2 is stopped after the stop of the supply of the alternating-current voltage AC1 and recovered after recovery of the supply of the alternating-current voltage AC1.

First, the switching circuit 48 is turned on in response to the stop of the supply of the alternating-current voltage AC1 ((a) illustrated in FIG. 10) and supplies, as the direct-current voltage DC5, the direct-current voltage DC3 generated by the AC/DC converting circuit 40 to the power supply device 100A ((b) illustrated in FIG. 10). The control circuit 54 notifies the processor CPU of information indicating the stop of the supply of the alternating-current voltage AC1 ((c) illustrated in FIG. 10). The power supply control program PGM that is executed by the processor CPU receives the notification indicating the stop of the supply of the alternating-current voltage AC1 from the control circuit 54 and waits for a notification indicating the stop of the supply of the alternating-current voltage AC2 ((d) illustrated in FIG. 10). Then, the shutdown process is executed after the stop of the supply of the alternating-current voltage AC2, and the switching circuits 48 and 50 are turned off in the same manner as illustrated in FIG. 7.

When the supply of the alternating-current voltage AC1 is recovered, the AC/DC converting circuit 30 of the power supply device 100A starts generating the direct-current voltage DC1 ((e) illustrated in FIG. 10). After the direct-current voltage DC1 is increased, the processor CPU executes the power-on sequence and activates the operating system OS in the same manner as illustrated in FIG. 7 ((f) illustrated in FIG. 10). Operations that are executed after the activation of the operating system OS are the same as those illustrated in FIG. 7, except that the times to recover the supply of the alternating-current voltage AC2 are different.

FIG. 11 is a diagram illustrating another example of operations of the computer system illustrated in FIG. 6. Specifically, FIG. 11 illustrates the other example of the operations of the backup power supply device 200B, power supply system PSYS and computer device 300 that are illustrated in FIG. 6. A detailed description of the same operations as those illustrated in FIGS. 3 and 7 is omitted. FIG. 11 illustrates operations to be executed in the example in which the supply of the alternating-current voltage AC1 is stopped after the stop of the supply of the alternating-current voltage AC2 and recovered after recovery of the supply of the alternating-current voltage AC2.

First, the switching circuit 50 is turned on in response to the stop of the supply of the alternating-current voltage AC2 and causes the direct-current voltage DC4 to be supplied from the battery 52 to the DC/DC converting circuit 42. The DC/DC converting circuit 42 receives the direct-current voltage DC4 from the battery 52 and generates a direct-current voltage in the same manner as illustrated in FIG. 9. The control circuit 54 notifies the processor CPU of information that indicates the stop of the supply of the alternating-current voltage AC2 ((a) illustrated in FIG. 11). The power supply control program PGM that is executed by the processor CPU receives the notification from the control circuit 54 and waits for a notification that indicates the stop of the supply of the alternating-current voltage AC1 ((b) illustrated in FIG. 11).

When the supply of the alternating-current voltage AC1 is stopped, the switching circuit 48 is turned on so as to supply the direct-current voltage DC5 to the DC/DC converting circuit 32 of the power supply device 100A. In this case, the switching circuit 50 has been turned on in response to the stop of the supply of the alternating-current voltage AC2 and the DC/DC converting circuit 42 continuously operates. Thus, when the supply of the alternating-current voltage AC1 is stopped, the direct-current voltage DC5 may be immediately supplied to the power supply device 100A. After the control circuit 54 outputs the notification that indicates the stop of the supply of the alternating-current voltage AC1, the shutdown process is executed. Operations that are executed until the switching circuits 48 and 50 are turned off are similar to those illustrated in FIG. 7.

When the supply of the alternating-current voltage AC2 is recovered, the AC/DC converting circuit 40 of the backup power supply device 200B generates the direct-current voltage DC3 and starts charging the battery 52. When the supply of the alternating-current voltage AC1 is recovered, the AC/DC converting circuit 30 of the power supply device 100A starts generating the direct-current voltage DC1 ((c) illustrated in FIG. 11). After the direct-current voltage DC1 is increased, the processor CPU executes the power-on sequence and activates the operating system OS in the same manner as illustrated in FIG. 7 ((d) illustrated in FIG. 11).

Figure 12:
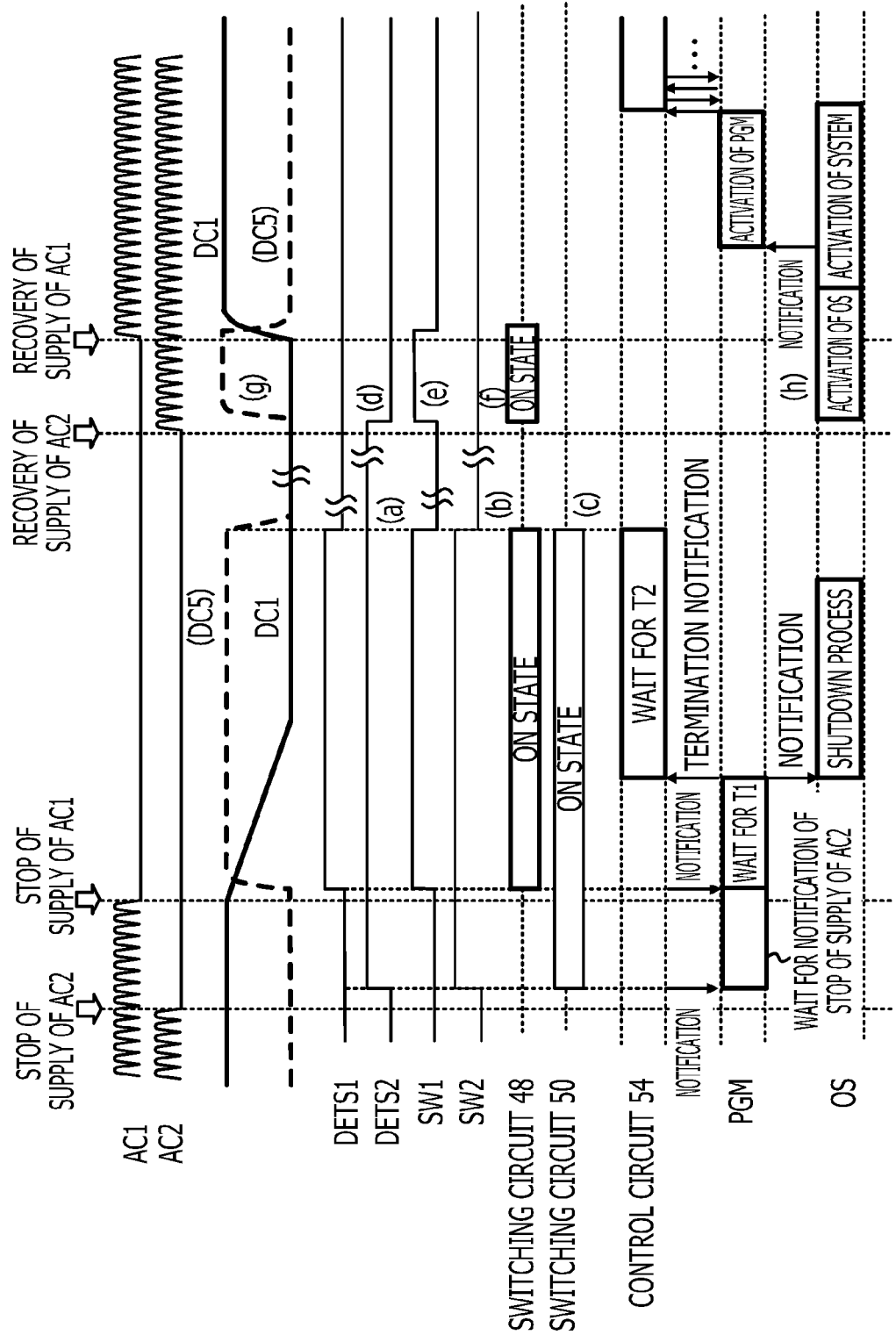
FIG. 12 is a diagram illustrating another example of the operations of the backup power supply device and computer device that are illustrated in FIG. 6.

FIG. 12 is a diagram illustrating another example of operations of the computer system illustrated in FIG. 6. Specifically, FIG. 12 illustrates the other example of the operations of the backup power supply device 200B, power supply system PSYS and computer device 300 that are illustrated in FIG. 6. A detailed description of the same operations as those illustrated in FIGS. 3, 7 and 11 is omitted. FIG. 12 illustrates the example in which the direct-current voltage DC5 is supplied to the power supply device 100A within a time period (illustrated in FIG. 11) from the recovery of the supply of the alternating-current voltage AC2 to the recovery of the supply of the alternating-current voltage AC1. Operations that are executed after the supply of the alternating-current voltage AC2 is stopped and until the switching circuits 48 and 50 are turned off are nearly the same as those illustrated in FIG. 11.

In this example, the detecting circuit 46 continuously detects the alternating-current voltage AC2 after the switching circuits 48 and 50 are turned off. Thus, the detection signal DETS2 is maintained at the active level ((a) illustrated in FIG. 12). Specifically, the control circuit 54 forcibly turns off the switching circuit 50 after the time period T2 ((b and c) illustrated in FIG. 12). In this case, the control circuit 54 does not turn off the switching circuit 50 on the basis of the detection signal DETS2. The control circuit 54 stores, as power-down information, information indicating that the switching circuits 48 and 50 have been turned off on the basis of a termination notification provided by the power supply control program PGM.

When detecting the recovery of the supply of the alternating-current voltage AC2, the detecting circuit 46 sets the detection signal DETS2 to the inactive level ((d) illustrated in FIG. 12). When the control circuit 54 has the power-down information stored therein, the control circuit 54 sets the control signal SW1 to the active level in response to the inactive level of the detection signal DETS2 ((e) illustrated in FIG. 12). Then, the switching circuit 48 is turned on ((f) illustrated in FIG. 12) so as to supply, as the direct-current voltage DC5, the direct-current voltage generated using the direct-current voltage DC3 by the DC/DC converting circuit 42 to the power supply device 100A in response to the recovery of the supply of the alternating-current voltage AC2 ((g) illustrated in FIG. 12).

After the direct-current voltage DC5 output from the power supply 200B is increased, the processor CPU executes the power-on sequence and activates the operating system OS ((h) illustrated in FIG. 12). Operations that are executed after the activation of the operating system OS are nearly the same as those illustrated in FIG. 7. The operating system OS may be early activated by turning on the switching circuit 48 upon the recovery of the supply of the alternating-current voltage AC2 and supplying the direct-current voltage DC5 from the backup power supply device 200B to the power supply device 100A. Thus, a period of time from the recovery of the supply of the alternating-current voltage AC1 to the restart of the operation of the computer system may be reduced. The operational efficiency and reliability of the computer system, therefore, may be improved.

After the operations that are illustrated in FIG. 7 and executed due to the stop of the supply of the alternating-current voltages AC1 and AC2, operations that are illustrated in FIG. 10, 11 or 12 and executed after the recovery of the supply of the alternating-current voltages AC1 and AC2 may be executed. After operations that are illustrated in FIG. 10 or 11 and executed due to the stop of the supply of the alternating-current voltages AC1 and AC2, the operations that are illustrated in FIG. 7 and executed after the recovery of the supply of the alternating-current voltages AC1 and AC2 may be executed.

Figure 13:
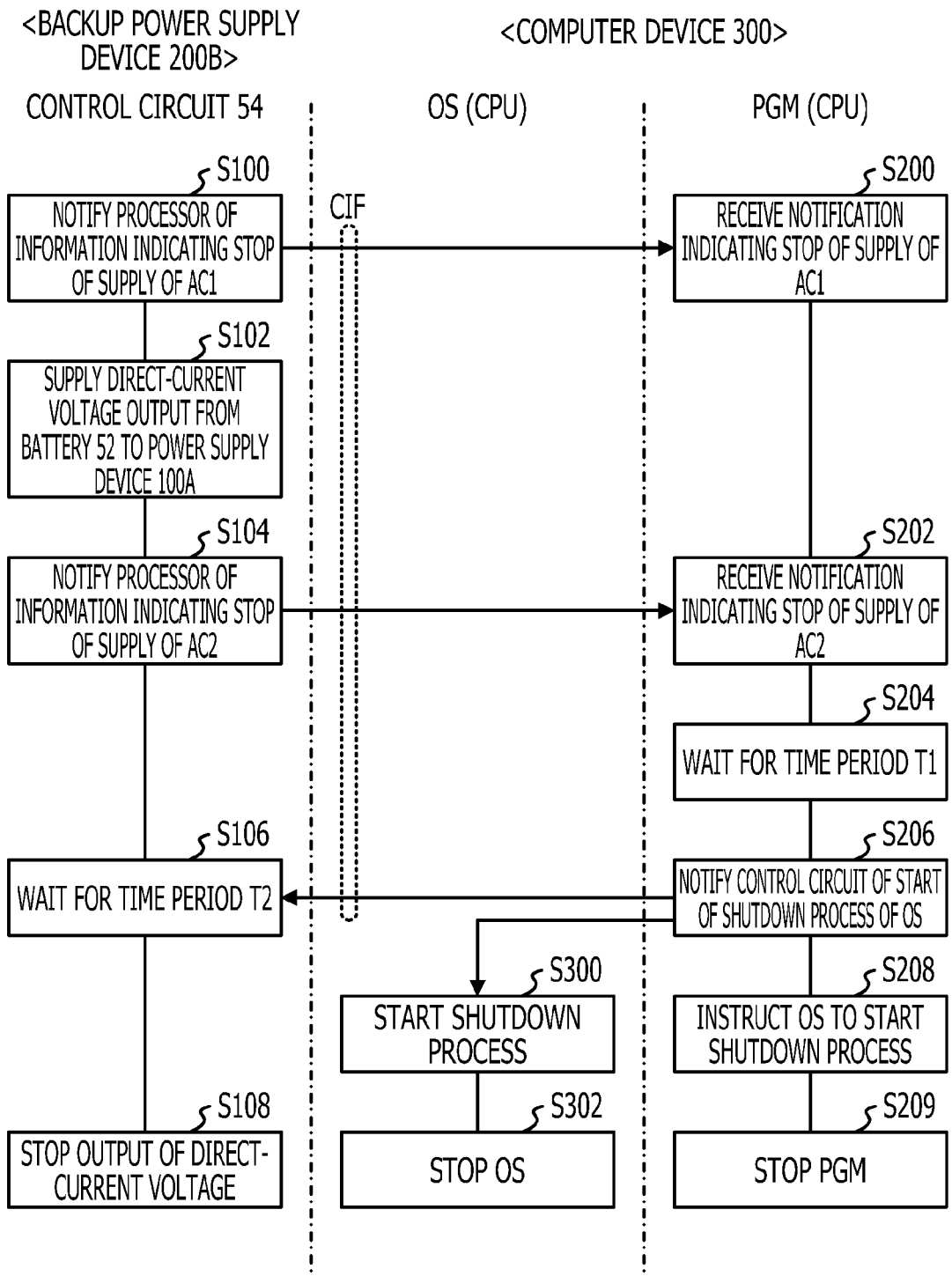
FIG. 13 is a diagram illustrating an example of a process that is executed by the computer system illustrated in FIG. 6 upon an electricity failure.

FIG. 13 is a diagram illustrating an example of a process that is executed by the computer system illustrated in FIG. 6 upon an electricity failure. FIG. 13 is a flowchart of the example of the process, namely a power supply control method, which is executed by the control circuit 54, the operating system OS and the power supply control program PGM after the electricity failure and until the switching circuits 48 and 50 are turned off as illustrated in FIGS. 7 and 10. The operating system OS and the power supply control program PGM are executed in parallel by causing the single processor CPU to execute a multi-task process.

First, in S100, when the supply of the alternating-current voltage AC1 is stopped, the control circuit 54 notifies, through the communication interface CIF, the processor CPU that currently executes the power supply control program PGM of information that indicates the stop of the supply of the alternating-current voltage AC1. In S200, the power supply control program PGM receives the notification indicating the stop of the supply of the alternating-current voltage AC1 from the control circuit 54 and waits for a notification that indicates the stop of the supply of the alternating-current voltage AC2.

In S102, the control circuit 54 turns on the switching circuits 48 and 50 and causes the direct-current voltage DC4 to be supplied from the battery 52 to the power supply device 100A. After that, in S104, the control circuit 54 detects the stop of the supply of the alternating-current voltage AC2 and notifies, through the communication interface CIF, the processor CPU that currently executes the power supply control program PGM of information that indicates the stop of the supply of the alternating-current voltage AC2.

In S202, the power supply control program PGM receives the notification indicating the stop of the supply of the alternating-current voltage AC2 from the control circuit 54. In S204, the power supply control program PGM waits until the time period T1 elapses. In S206, after the time period T1 elapses, the power supply control program PGM notifies the control circuit 54 of the start of the shutdown process of the operating system OS. In S208, after the time period T1 elapses, the power supply control program PGM instructs the operating system OS to start the shutdown process. After that, in S209, the execution of the power supply control program PGM is stopped. For example, during the time when the computer device 300 receives the direct-current voltage DC2, the power supply control program PGM saves data and repeats a "no operation" command.

In S106, after receiving the notification indicating the start of the shutdown process from the power supply control program PGM, the control circuit 54 waits until the time period T2 elapses. After that, in S108, the control circuit 54 turns off the switching circuits 48 and 50 and thereby stops the output of the direct-current voltage DC5 to the power supply device 100A after the time period T2 elapses.

In S300, the operating system OS that is executed by the processor CPU starts the shutdown process in response to the instruction of the start of the shutdown process. In S302, the operating system OS stops the process after completion of the shutdown process. For example, during the time when the computer device 300 receives the direct-current voltage DC2, the operating system OS repeats a "no operation" command.

Figure 14:
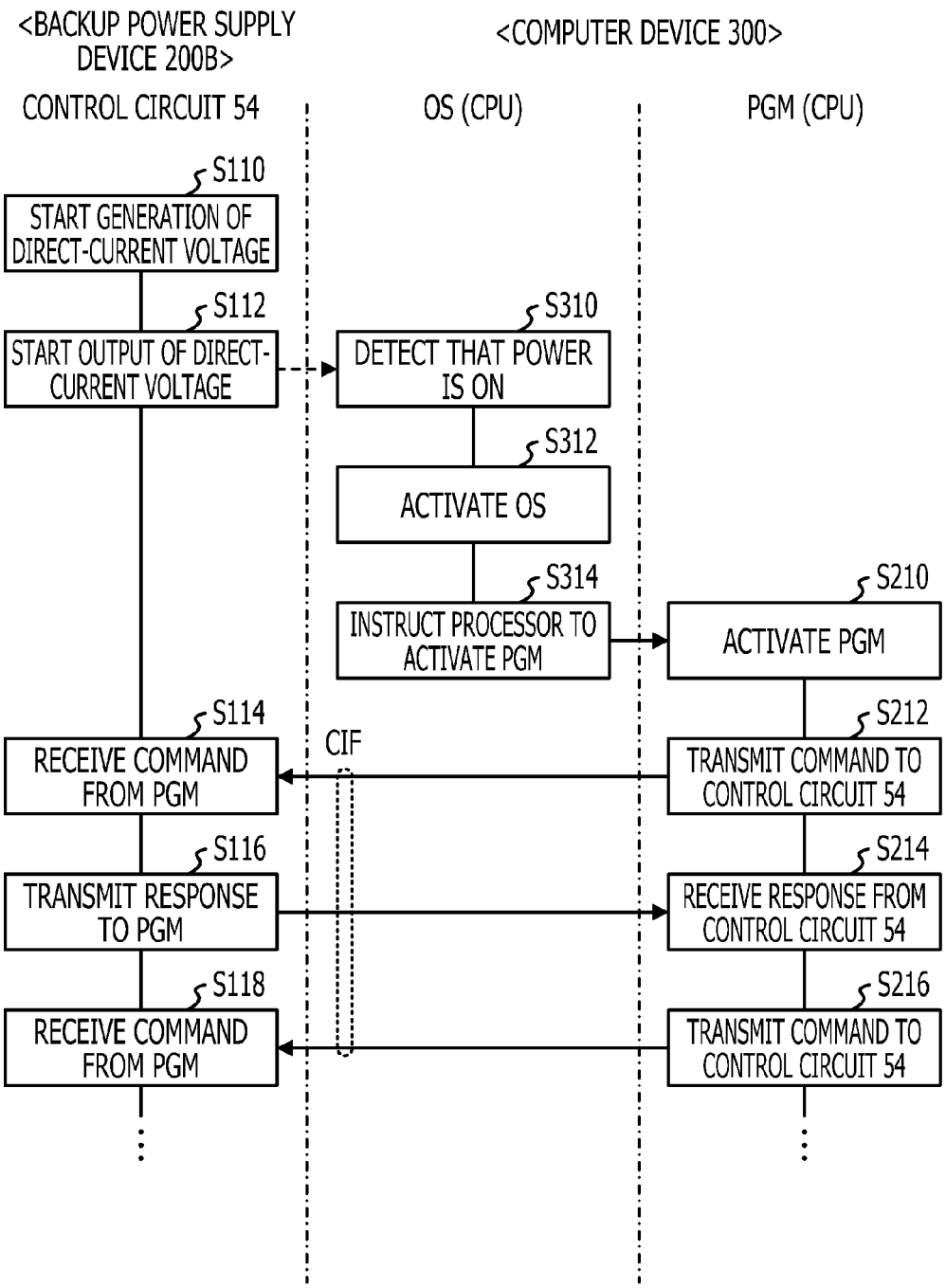
FIG. 14 is a diagram illustrating an example of a process that is executed by the computer system illustrated in FIG. 6 upon recovery from the electricity failure.

FIG. 14 is a diagram illustrating an example of a process that is executed by the computer system illustrated in FIG. 6 upon recovery from an electricity failure. FIG. 14 is a flowchart of the example of the process (illustrated in FIG. 12), namely the power supply control method, which is executed by the control circuit 54, the operating system OS and the power supply control program PGM after the recovery of the supply of the alternating-current voltage AC2.

First, in S110, the control circuit 54 starts the generation of the direct-current voltage DC3 in response to the supply of the alternating-current voltage AC2. In S112, the control circuit 54 turns on the switching circuit 48 and causes the direct-current voltage DC5 to be output to the computer device 300 through the power supply device 100A. The DC/DC converting circuit 32 of the power supply device 100A generates the direct-current voltage DC2 on the basis of the direct-current voltage DC5.

In S310, the operating system OS detects, on the basis of the supply of the direct-current voltage DC2, that the power is on. In S312, the operating system OS executes the power-on sequence. In S314, the operating system OS instructs the processor CPU to activate the power supply control program PGM.

In S210, the processor CPU activates the power supply control program PGM in response to the instruction received from the operating system OS. In S212, the power supply control program PGM transmits a command to the control circuit 54 and starts communicating with the control circuit 54.

In S114, the control circuit 54 receives the command from the power supply control program PGM. In S116, the control circuit 54 transmits a response to the reception of the command to the power supply control program PGM. In S214, the power supply control program PGM receives the response from the control circuit 54 and confirms that the communication has been established through the communication interface CIF.

After that, the communication is executed at a certain frequency between the power supply control program PGM and the control circuit 54 in order to transmit a notification that indicates the stop of the supply of the alternating-current voltage AC1 or AC2. Specifically, in S216, the power supply control program PGM transmits a command to the control circuit 54. In S118, the control circuit 54 receives the command from the power supply control program PGM and executes a process corresponding to the command. An example of the command transmitted by the power supply control program PGM is a command to confirm the capacity of the battery 52 of the backup power supply device 200B.

As described above, the communication between the power supply control program PGM and the control circuit 54 may be executed using an issued command, an issued packet or polling or may be executed on the basis of an interrupt request transmitted by the control circuit 54.

Figure 15:
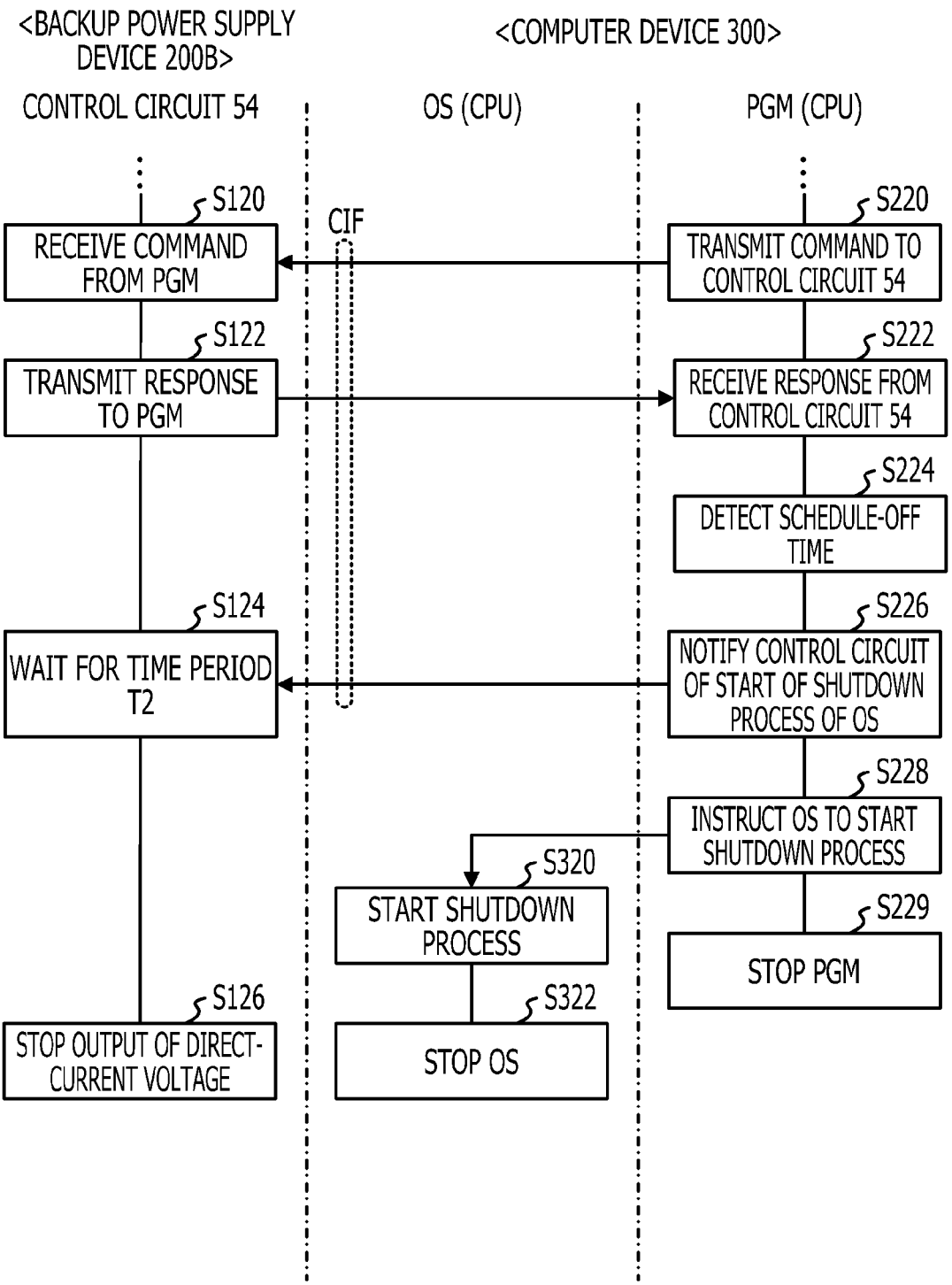
FIG. 15 is a diagram illustrating an example of a process that is executed by the computer system illustrated in FIG. 6 in order to execute schedule-off.

FIG. 15 is a diagram illustrating an example of a process that is executed by the computer system illustrated in FIG. 6 in order to execute schedule-off. The schedule-off is a process of shutting down the operating system OS at a set time and stopping the power supply control program PGM. In the schedule-off, the set time is detected by the power supply control program PGM. A detailed description of the same processes as those illustrated in FIG. 13 is omitted.

Before the set time, the power supply control program PGM and the control circuit 54 communicate with each other as indicated by S S220, S120, S122 and S222. The processes of S S220, S120, S122 and S222 are the same as or similar to the processes of S S212, S114, S116 and S214 illustrated in FIG. 14, respectively.

In S224, the power supply control program PGM detects that the set time has elapsed. Processes of S226, S228 and S229 are the same as or similar to the processes of S206, S208 and S209 illustrated in FIG. 13, respectively. Processes of S124 and S126 are the same as or similar to the processes of S106 and S108 illustrated in FIG. 13, respectively. Processes of S320 and S322 are the same as or similar to the processes of S300 and S302 illustrated in FIG. 13, respectively. In the schedule-off described in this example, the backup power supply device 200B stops outputting the direct-current voltage after the shutdown process of the operating system OS in order to reduce the amount of power to be consumed by the computer system.

Figure 16:
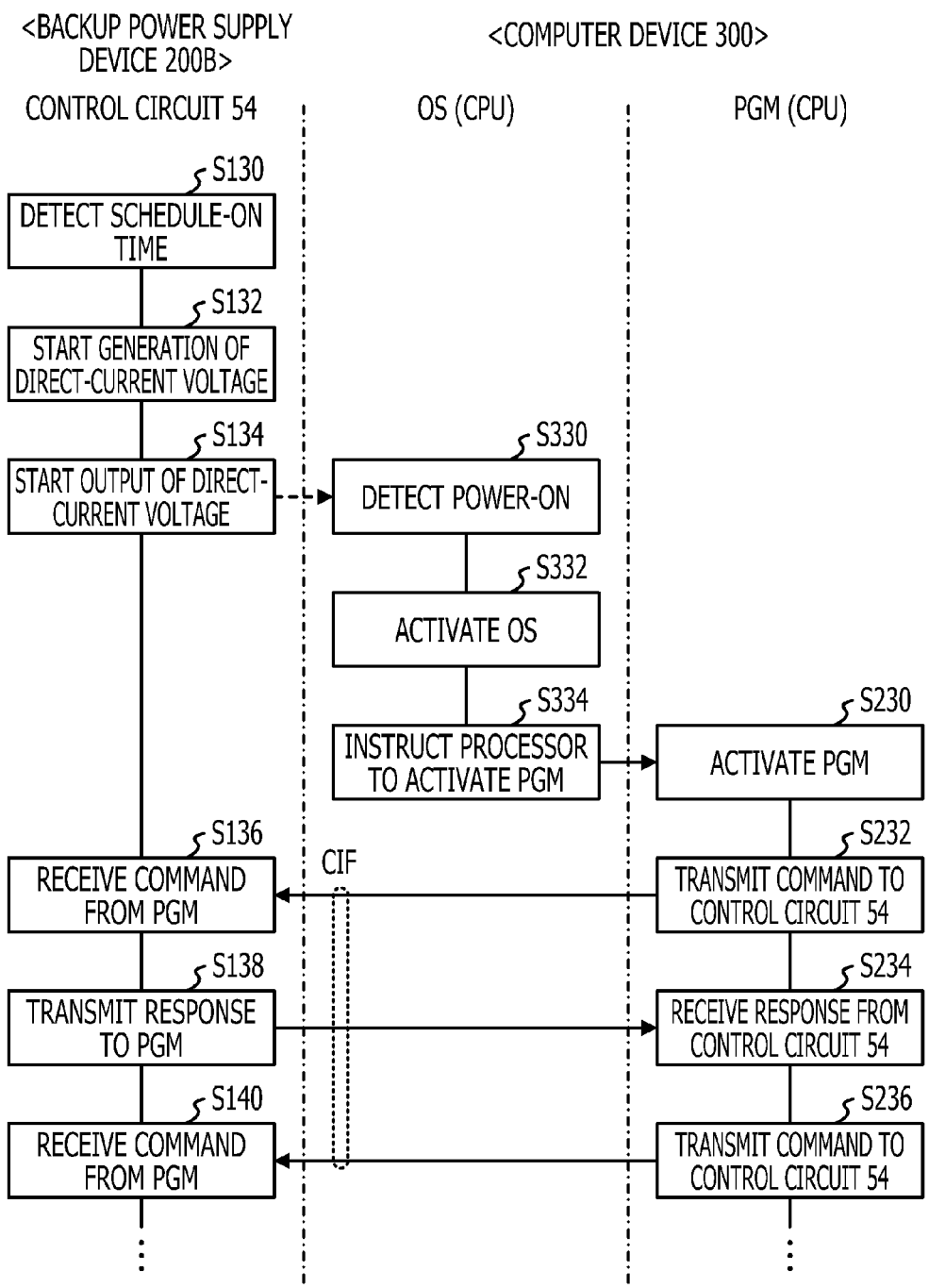

FIG. 16 is a diagram illustrating an example of a process that is executed by the computer system illustrated in FIG. 6 in order to execute schedule-on. The schedule-on is a process of activating the operating system OS and the power supply control program PGM at a set time and starting communication between the power supply control program PGM and the control circuit 54. In the schedule-on, the set time is detected by the control circuit 54. A detailed description of the same processes as those illustrated in FIG. 14 is omitted.

First, in S130, the control circuit 54 detects that the set time has elapsed. Processes of S132, S134, S136, S138 and S140 are the same as or similar to the processes of S110, S112, S114, S116 and S118 illustrated in FIG. 14, respectively. Processes of S330, S332 and S334 are the same as or similar to the processes of S310, S312 and S314 illustrated in FIG. 14, respectively. Processes of S230, S232, S234 and S236 are the same as or similar to the processes of S210, S212, S214 and S216 illustrated in FIG. 14, respectively.

Figure 17:
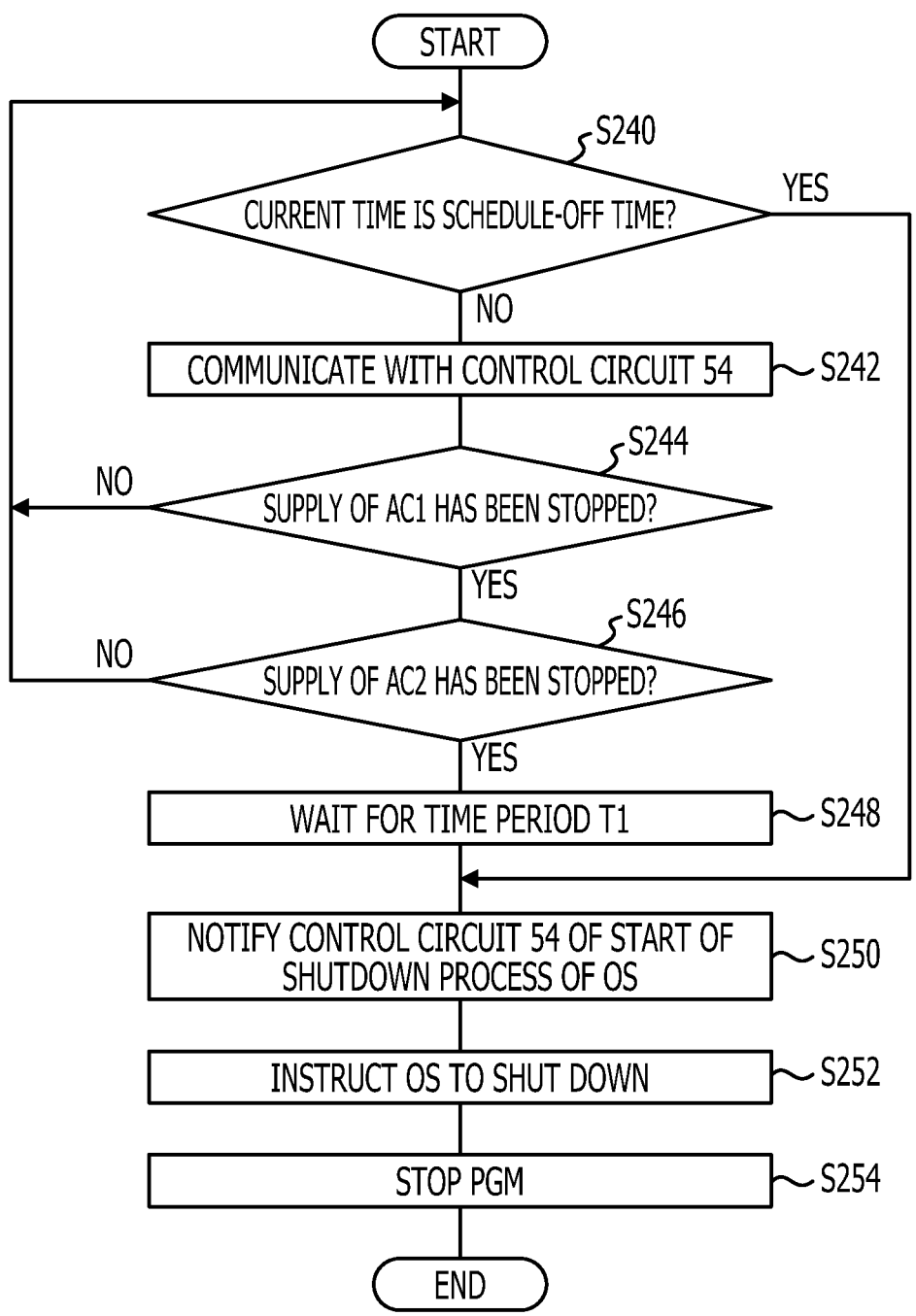
FIG. 17 is a diagram illustrating an example of a power supply control program that is executed by a CPU illustrated in FIG. 6.

FIG. 17 is an exemplary flowchart of the power supply control program PGM that is executed by the processor CPU illustrated in FIG. 6. The processor CPU activates the power supply control program PGM in S210 illustrated in FIG. 14 and S230 illustrated in FIG. 16 and then executes a process illustrated in FIG. 17.

First, in S240, the processor CPU determines whether or not the current time is a schedule-off time. If the current time is the schedule-off time, the process proceeds to S250. If the current time is before the schedule-off time or a function of the schedule-off is not set, the process proceeds to S242. S240 is a process corresponding to S224 illustrated in FIG. 15.

In S242, the processor CPU communicates with the control circuit 54 and receives, from the control circuit 54, information of the states of the alternating-current voltages AC1 and AC2, a charged capacity of the battery 52 and the like. For example, if the battery 52 is fully charged, the processor CPU may issues, to the control circuit 54, an instruction to stop an operation of the AC/DC converting circuit 40. Thus, the amount of power to be consumed by the backup power supply device 200B may be reduced. S242 is a process corresponding to S212, S214 and S216 illustrated in FIG. 14, S220 and S222 illustrated in FIG. 15 and S232, S234 and S236 illustrated in FIG. 16.

In S244, the processor CPU determines whether or not the information received from the control circuit 54 includes information that indicates the stop of the supply of the alternating-current voltage AC1. If the stop of the supply of the alternating-current voltage AC1 is detected, the process proceeds to S246. If the supply of the alternating-current voltage AC1 is not stopped, the process returns to S240. S244 is a process corresponding to S200 illustrated in FIG. 13.

In S246, the processor CPU determines whether or not the information received from the control circuit 54 includes information that indicates stop of the supply of the alternating-current voltage AC2. If the stop of the supply of the alternating-current voltage AC2 is detected, the process proceeds to S248. If the supply of the alternating-current voltage AC2 is not stopped, the process returns to S240. S246 is a process corresponding to S202 illustrated in FIG. 13.

In S248, the processor CPU waits until the time period T1 elapses. S248 is a process corresponding to S204 illustrated in FIG. 13. In S250, the processor CPU notifies the control circuit 54 of the start of the shutdown process of the operating system OS. S250 is a process corresponding to step 206 illustrated in FIG. 13 and S226 illustrated in FIG. 15.

In S252, the processor CPU instructs the operating system OS to start the shutdown process. S252 is a process corresponding to S208 illustrated in FIG. 13 and S228 illustrated in FIG. 15. In S254, the processor CPU stops the execution of the power supply control program PGM. S254 is a process corresponding to S209 illustrated in FIG. 13 and S229 illustrated in FIG. 15.

In the present embodiment, effects that are the same as or similar to those obtained in the first and second embodiments may be obtained. In addition, since operations of the circuits other than the control circuit 54 are stopped for a time period in which the supply of the alternating-current voltage AC2 is stopped, the amount of power to be consumed by the backup power supply device 200B and draining of the battery 52 may be suppressed. As a result, the operational efficiency and reliability of the computer device 300 may be improved. Since the switching circuit 50 is turned on in response to the stop of the supply of the alternating-current voltage AC2 and the DC/DC converting circuit 42 continuously operates, the direct-current voltage DC5 may be immediately supplied to the power supply device 100A when the supply of the alternating-current voltage AC1 is stopped after the stop of the supply of the alternating-current voltage AC2. In addition, an "N+1 redundant system" for the power supply device 100A may be built using the backup power supply device 200B.

Figure 18:
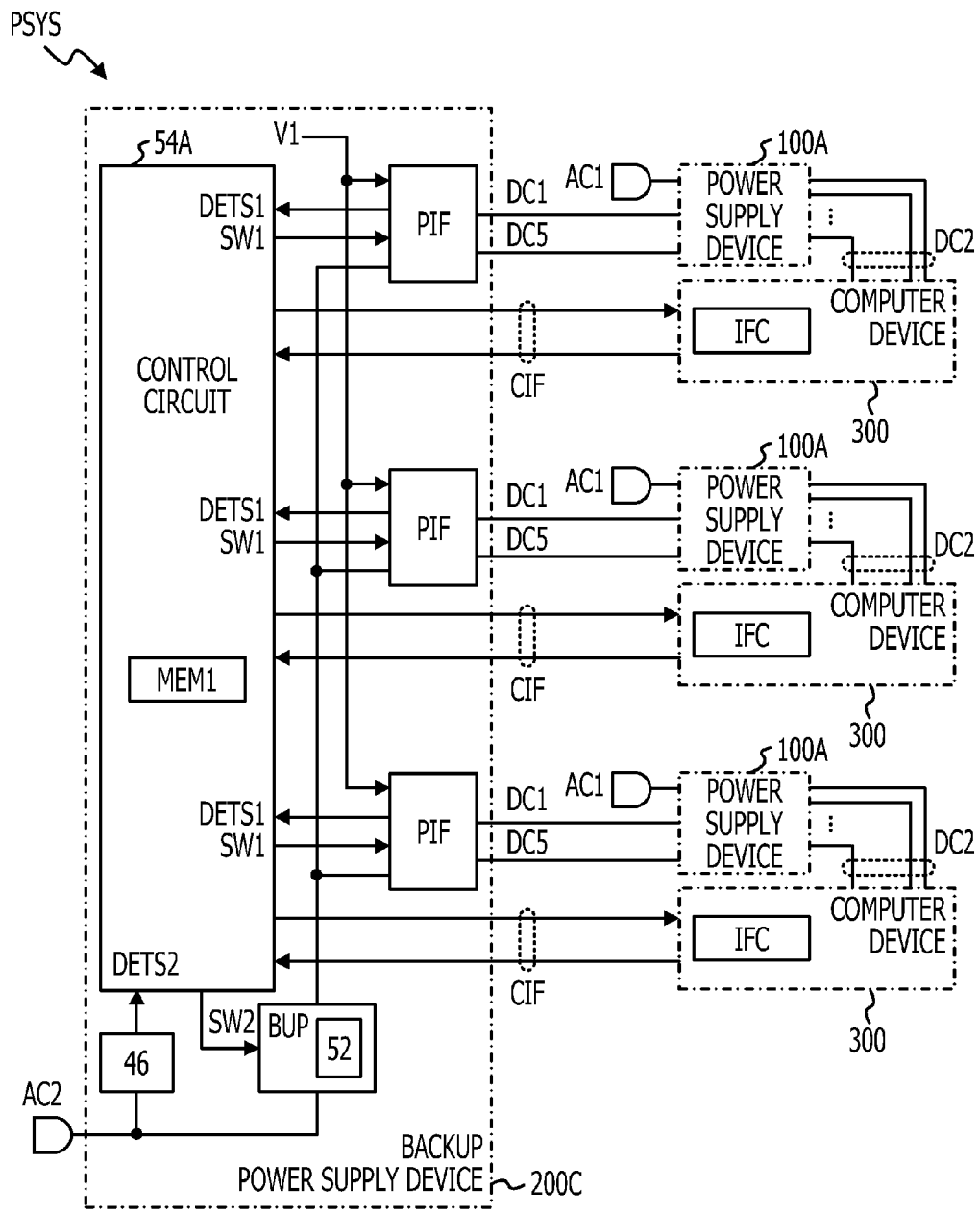
FIG. 18 is a diagram illustrating an example of a backup power supply device, a power supply system and a computer system according to the fourth embodiment.

FIG. 18 is a diagram illustrating an example of a backup power supply device, a power supply system and a computer system according to the fourth embodiment. Parts that are the same as those described in the first to third embodiments are indicated by the same reference numerals and symbols as those described in the first to third embodiments, and a detailed description thereof is omitted. In the present embodiment, a backup power supply device 200C is commonly provided for a plurality of power supply devices 100A and a plurality of computer devices 300.

The power supply devices 100A are the same as the power supply 100A illustrated in FIG. 6. The computer devices 300 are the same as the computer device illustrated in FIG. 6. The processors CPU (illustrated in FIG. 6) that are included in the computer devices 300 execute the power supply control program PGM described with reference to FIG. 17 in order to achieve the processes illustrated in FIGS. 7 to 16, namely the power supply control method.

The power supply devices 100A are coupled to the computer devices 300 through direct-current voltage lines DC2. For example, the computer devices 300 that are coupled to the power supply devices 100A through the direct-current voltage lines DC2 are stored as rack servers in a rack 400 illustrated in FIG. 19. The power supply system includes the backup power supply device 200C and the power supply devices 100A, like the power supply systems illustrated in FIGS. 1 and 2. The computer system includes the backup power supply system 200C, the power supply devices 100A and the computer devices 300, like the computer system illustrated in FIG. 2.

The backup power supply device 200C includes a detecting circuit 46, a backup section BUP, a control circuit 54A and a plurality of power supply interfaces PIF. The power supply interfaces PIF are coupled to the power supply devices 100A, respectively. The detecting circuit 46 is the same as or similar to the detecting circuit 46 illustrated in FIG. 6. The backup section BUP is the same as or similar to the backup section BUP, except that the backup section BUP has a battery 52 with a large capacity in order for the backup power supply device 200C to be used as a backup for the plurality of power supply devices 100A. The power supply interfaces PIF are the same as or similar to the power supply interface PID illustrated in FIG. 6.

The control circuit 54A receives detection signals DETS1 from the power supply interfaces PIF. The control circuit 54A has a function of outputting the control signal SW1 to the power supply interfaces PIF and a function of communicating with the communication interface circuits IFC of the computer devices 300 through the communication interfaces CIF. The memory MEM1 of the control circuit 54A stores information of a plurality of time periods T2 corresponding to periods of time to execute the shutdown process (illustrated in FIG. 7) of the plurality of computer devices 300. Other functions of the control circuit 54A are the same as or similar to the control circuit 54 illustrated in FIG. 6. The control circuit 54A operates in order to execute the processes illustrated in FIGS. 7 to 16 for each of the power supply devices 100A.

The control circuit 54A may be coupled to the plurality of communication interface circuits IFC through a common communication interface CIF. In this case, data to be transmitted and received through the communication interface CIF includes information that identifies the power supply devices 100A.

Figure 19:
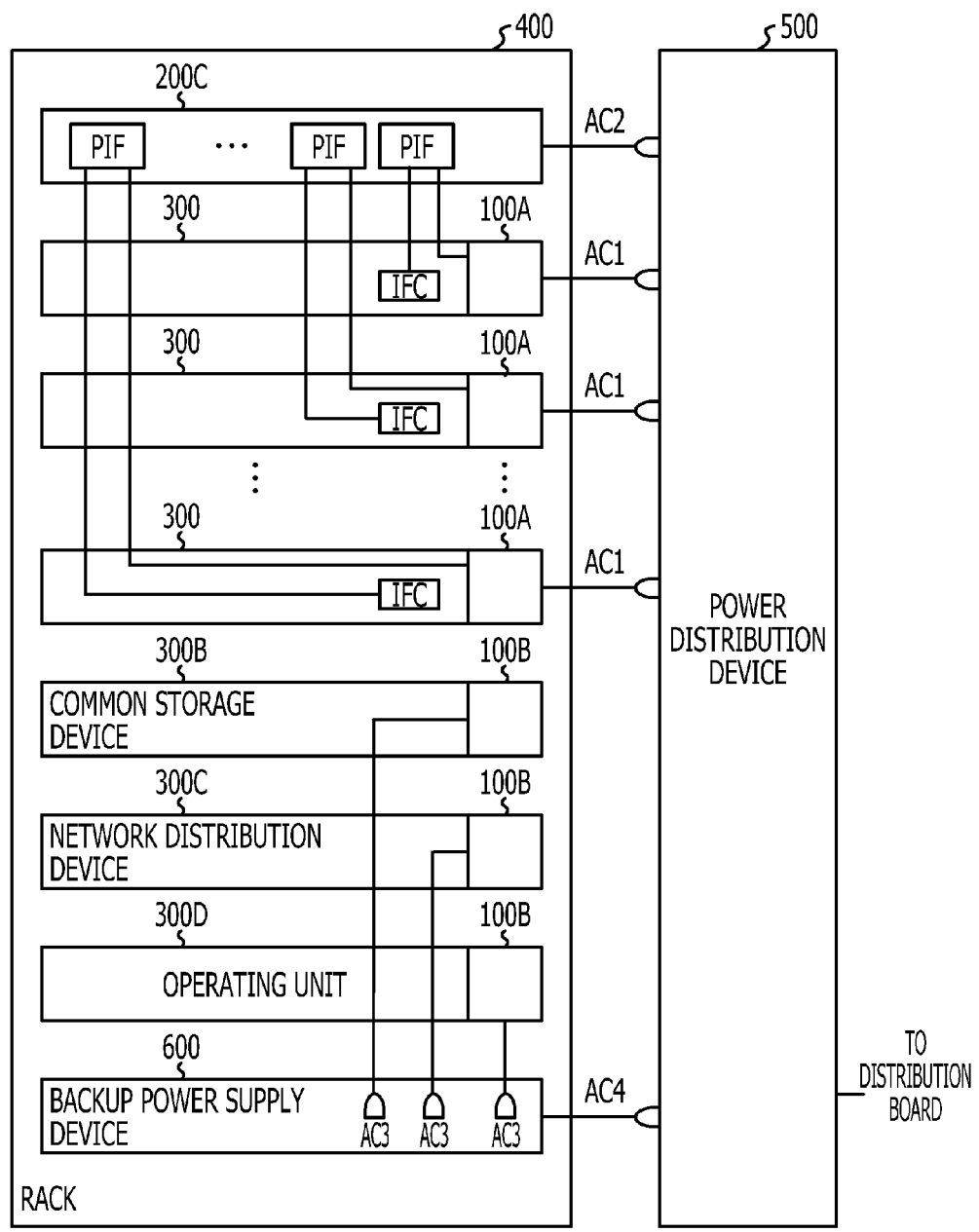
FIG. 19 is a diagram illustrating an example of a rack in which the computer system illustrated in FIG. 18 is stored.

FIG. 19 is a diagram illustrating an example of the rack 400 that stores the computer system illustrated in FIG. 18. The rack 400 stores the backup power supply device 200C (illustrated in FIG. 18), the plurality of computer devices 300 (illustrated in FIG. 18), the plurality of power supply devices 100A (illustrated in FIG. 18), a common storage device 300B, a network distribution device 300C, an operating unit 300D, a backup power supply device 600 and power supply devices 1006.

The backup power supply device 200C and the backup power supply device 600 are designed on the basis of the heights of storage spaces that are arranged at predetermined pitches in the rack 400. The computer devices 300 and the power supply devices 100A are stored in storage spaces of the rack 400. In this case, the computer devices 300 are stored as the rack servers.

In FIG. 19, cables that connect the power supply interfaces PIF of the backup power supply device 200C to the communication interface circuits IFC of the computer devices 300 and the power supply devices 100A are indicated by L-shaped lines. The cables, however, are actually stored in a cable storage space provided in the rack 400.

The common storage device 300B includes a storage device that is a hard disk device or the like and stores common data of the computer devices 300. The common storage device 300B and the power supply device 100B for supplying power to the common storage device 300B are stored in a storage space of the rack 400.

For example, the network distribution device 300C includes a hub or router that is used to branch a network cable extending from the outside of the rack 400 and connect the network cable to the network interface circuits NIFC (illustrated in FIG. 6) of the computer devices 300. Thus, cables (network interfaces NIF illustrated in FIG. 6) that are coupled to the network interface circuits NIFC of the computer devices 300 are coupled to the network distribution device 300C. The network distribution device 300C and the power supply device 100B for supplying power to the network distribution device 300C are stored in a storage space of the rack 400.

For example, the operating unit 300D includes a display device, a keyboard, a mouse and a switching device. The switching device is operated by an operator of the computer system in order to selectively connect the display device, the keyboard and the mouse to any of the computer devices 300. The operating unit 300D and the power supply device 100B for supplying power to the operating unit 300D are stored in a storage space of the rack 400.

The power supply devices 100B that correspond to the common storage device 300B, the network distribution device 300C and the operating unit 300D each receive an alternating-current voltage AC3 from the backup power supply device 600. For example, since the anode and cathode of the diode D1 of the power supply device 100A (illustrated in FIG. 6) are coupled to each other in each of the power supply devices 100B, the power supply devices 100B do not include the diode D1. The power supply devices 100B each generate a direct-current voltage of at least one type. The power supply device 100B that corresponds to the operating unit 300D may output the alternating-current voltage AC3 received from the backup power supply device 600 to the operating unit 300D in order to operate the display device.

The backup power supply device 200C receives an alternating-current voltage AC2 from a power distribution device 500 coupled to a distribution board and thereby operates. The power supply devices 100A that correspond to the computer devices 300 each receive an alternating-current voltage AC1 from the power distribution device 500 and receive a direct-current voltage from the backup power supply device 200C.

The backup power supply device 600 receives an alternating-current voltage AC4 from the power distribution device 500 and supplies the alternating-current voltage AC4 as the alternating-current voltage AC3 to the common storage device 300B, the network distribution device 300C and the operating unit 300D. The backup power supply device 600 has a battery therein and charges the battery using a direct-current voltage generated from the alternating-current voltage AC4. The backup power supply device 600 generates an alternating-current voltage from the battery upon an electricity failure and supplies the generated alternating-current voltage to the common storage device 300B, the network distribution device 300C and the operating unit 300D. Thus, the backup power supply device 600 functions as an uninterruptible power supply (UPS).

The configuration illustrated in FIG. 19 is an example in which the computer system is built using the newly arranged computer devices 300, the newly arranged power supply devices 100A, the existing common storage device 300B, the network distribution device 300, the operating unit 300D and the power supply devices 100B. For example, if the common storage device 300B, the network distribution device 300C and the operating unit 300D do not have a power supply device that has the same configuration as the power supply devices 100A, and the configuration illustrated in FIG. 19 is used, the cost of developing the computer system may be suppressed.

The configuration illustrated in FIG. 19 is the example in which the computer system is built using the backup power supply device 200C that outputs the direct-current voltage and the backup power supply device 600 that outputs the alternating-current voltage AC3.

Figure 20:
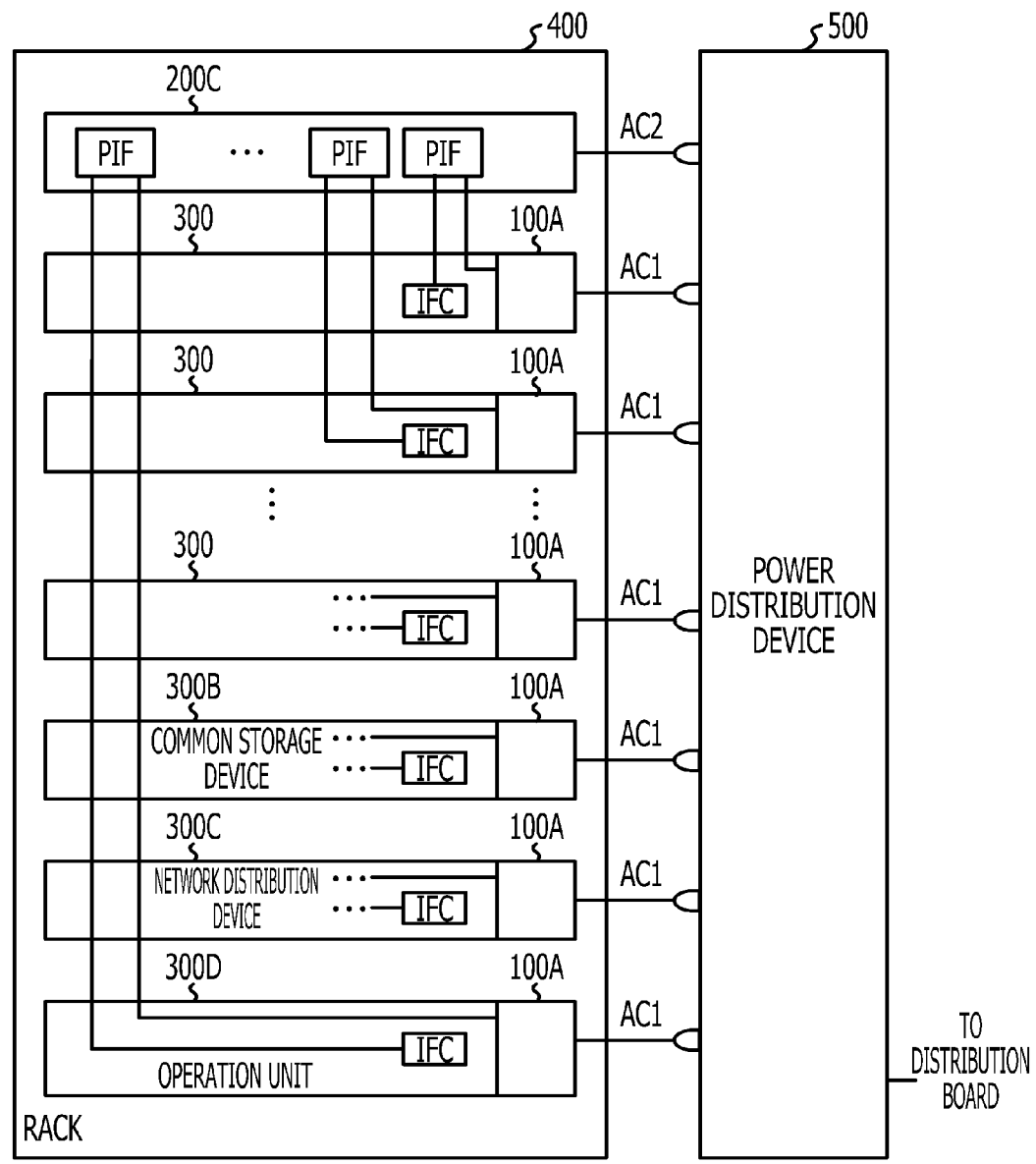
FIG. 20 is a diagram illustrating another example of the rack in which the computer system illustrated in FIG. 18 is stored.

FIG. 20 is a diagram illustrating another example of the rack 400 that stores the computer system illustrated in FIG. 18. In this example, the common storage device 300B, the network distribution device 300C and the operating unit 300D have the communication interface circuits IFC illustrated in FIG. 6, respectively, and are coupled to the power supply devices 100A, respectively.

The backup power supply device 200C includes power supply interfaces PIF that correspond to the common storage device 300B, the network distribution device 300C and the operating unit 300D. The control circuit 54A (illustrated in FIG. 18) of the backup power supply device 200C has a function of controlling the power supply interfaces PIF that correspond to the common storage device 300B, the network distribution device 300C and the operating unit 300D. The memory MEM1 (illustrated in FIG. 18) of the backup power supply device 200C stores information of time periods T2 that correspond to periods of time to execute the shutdown process (illustrated in FIG. 7) of the common storage device 300B, the network distribution device 300C and the operating unit 300D.

The common storage device 300B and the power supply device 100A for supplying power to the common storage device 300B are stored in a storage space of the rack 400. The network distribution device 300C and the power supply device 100A for supplying power to the network distribution device 300C are stored in a storage space of the rack 400. The operating unit 300D and the power supply device 100A for supplying power to the operating unit 300D are stored in a storage space of the rack 400.

The common storage device 300B, the network distribution device 300C and the operating unit 300D each include the processor CPU (illustrated in FIG. 6) and a memory storing the power supply control program PGM to be executed by the processor CPU in order to execute the same processes (namely the power supply control method) as the processes illustrated in FIGS. 7 to 17.

The backup power supply 200C receives the alternating-current voltage AC2 from the power distribution device 500 coupled to the distribution board and thereby operates. The power supply devices 100A that correspond to the computer devices 300, the common storage device 300B, the network distribution device 300C and the operating unit 300D each receive the alternating-current voltage AC1 from the power distribution device 500 and thereby operate.

The configuration illustrated in FIG. 20 is the example in which the computer system is build using the newly arranged computer devices 300, the power supply devices 100A, the common storage device 300B, the network distribution device 300C, the operating unit 300D and the backup power supply device 200C.

In the present embodiment, effects that are the same as or similar to those obtained in the first to third embodiments may be obtained. In addition, since the backup power supply device 200C is commonly provided for the plurality of computer devices 300, the operational efficiencies and reliabilities of the computer devices 300 stored as the rack servers may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A backup power supply device that is electrically coupled to a normal power supply device that includes a first converter configured to convert a first alternating current voltage into a first direct-current voltage, the backup power supply device comprising:
 a second converter that converts a second alternating-current voltage inputted into the backup power supply device into a second direct-current voltage;

a battery that is charged by the second direct-current voltage and configured to output a third direct-current voltage;

a first detector configured to receive an output of the first converter from the normal power supply device and output a first detection signal when a reduction of the first direct-current voltage outputted from the first converter is detected;

a switch that is electrically coupled to the normal power supply device, and configured to selectively supply either the second direct-current voltage outputted from the second converter or the third direct-current voltage outputted from the battery to the normal power supply device by switching, when the first detection signal is received;

a second detector that outputs a second detection signal when a reduction of the second alternating-current voltage outputted from the second converter is detected;

a control circuit coupled to a computer device operated by the normal power supply device or the backup power supply device and configured to:
  receive a termination notification on shutdown of the computer device from the computer device, after notifying the computer of the output of the first and second detection signals, and
  control the switch so that an output of the battery is not electrically coupled to the normal power supply device, after a predetermined time period after the termination notification is received.

2. The backup power supply device according to claim 1, further comprising:
  the second detector is directly coupled to an input of the battery.

3. The backup power supply device according to claim 2, wherein when the control circuit detects, based on the first and second detection signals, that the second alternating-current voltage of which the supply has been stopped has been output before the first alternating-current voltage of which supply has been stopped is output, the control circuit causes the first switch to connect the output of the battery or the output of the third converter to the normal power supply device.

4. The backup power supply device according to claim 1, further comprising:
  a third detector that is coupled to the output of the first converter and outputs a third detection signal when the first direct-current voltage is higher than a second predetermined value that is higher than the first predetermined value, and
  wherein the control circuit causes the first switch to connect one of the output of the battery and the output of the third converter to the normal power supply device based on the output of the first detection signal and causes the first switch to disconnect one of the output of the battery and the output of the third converter from the normal power supply device based on the output of the third detection signal.

5. The backup power supply device according to claim 1, wherein the switch is configured to:
  supply the second direct-current voltage outputted from the second converter to the normal power supply device by switching when a supply of the second alternating-current voltage is not stopped; and
  supply the third direct-current voltage outputted from the battery to the normal power supply device by switching when the supply of the second alternating-current voltage is stopped.

6. The backup power supply device according to claim 1, wherein the computer device is configured to
  suppress issuing the termination notification when a notification indicating recovery of a supply of the first alternating current voltage or the second alternating current voltage is received from the control circuit before the predetermined time period elapses, and
  suppress executing the shutdown of the computer device.

7. The backup power supply device according to claim 1, wherein the predetermined time period is set in a register included in the control circuit.

8. The backup power supply device according to claim 1, wherein
  the second converter supplies the second direct-current voltage to a DC/DC converting circuit through a first diode, and
  the DC/DC converting circuit converts the second direct-current voltage into a direct-current voltage that is equal or nearly equal to the first direct-current voltage and outputs the converted direct-current voltage to the switch.

9. The backup power supply device according to claim 8, wherein
  the input of the battery is coupled to an anode of the first diode, and
  the third direct-current voltage outputted from the battery is configured to be supplied to the DC/DC converting circuit through a second diode.

10. A power supply system comprising:
  a normal power supply device that includes a first converter configured to convert a first alternating-current voltage into a first direct-current voltage; and
  a backup power supply device that is electrically coupled to the normal power supply device,
  wherein the backup power supply device includes:
  a second converter that converts a second alternating-current voltage inputted into the backup power supply device into a second direct-current voltage;
  a battery that is charged by the second direct-current voltage and configured to output a third direct-current voltage;
  a first detector configured to receive an output of the first converter from the normal power supply device and output a first detection signal when a reduction of the first direct-current voltage outputted from the first converter is detected;
  a switch that is electrically coupled to the normal power supply device, and configured to selectively supply either the second direct-current voltage outputted from the second converter or the third direct-current voltage outputted from the battery to the normal power supply device by switching, when the first detection signal is received;
  a second detector that outputs a second detection signal when a reduction of the second alternating-current voltage outputted from the second converter is detected is detected;
  a control circuit coupled to a computer device operated by the normal power supply device or the backup power supply device and configured to:
    receive a termination notification on shutdown of the computer device from the computer device, after notifying the computer of the output of the first and second detection signals, and
    control the switch so that an output of the battery is not electrically coupled to the normal power supply device, after a predetermined time period after the termination notification is received.

11. The power supply system according to claim 10, wherein
the second detector is directly coupled to an input of the battery.

12. The power supply system according to claim 11, wherein when the control circuit detects, based on the first and second detection signals, that the second alternating-current voltage of which the supply has been stopped has been output before the first alternating-current voltage of which supply has been stopped is output, the control circuit causes the first switch to connect the output of the battery or the output of the third converter to the normal power supply device.

13. The power supply system according to claim 10, wherein the backup power supply device further includes
a third detector that is coupled to the output of the first converter and outputs a third detection signal when the first direct-current voltage is higher than a second predetermined value that is higher than the first predetermined value, and
wherein the control circuit causes the first switch to connect one of the output of the battery and the output of the third converter to the normal power supply device based on the output of the first detection signal and causes the first switch to disconnect one of the output of the battery and the output of the third converter from the normal power supply device based on the output of the third detection signal.

14. A backup method for a normal power supply device including a first converter configured to convert a first alternating current voltage into a first direct-current voltage, the backup method being executed by a backup power supply device that is electrically coupled to the normal power supply device, the backup method comprising:
converting, by a second converter, a second alternating-current voltage inputted into the backup power supply device into a second direct-current voltage;
outputting, by a battery that is charged by the second direct-current voltage, a third direct-current voltage;
receiving, by a first detector, an output of the first converter from the normal power supply device, and outputting a first detection signal when a reduction of the first direct-current voltage outputted from the first converter is detected;
selectively supplying, by a switch that is electrically coupled to the normal power supply device, either a second direct-current voltage outputted from a second converter or a third direct-current voltage outputted from a battery to the normal power supply device by switching, when the first detection signal is received;
outputting, by a second detector, a second detection signal when a reduction of the second alternating-current voltage outputted from the second converter is detected;
receiving, by a control circuit coupled to a computer device operated by the normal power supply device or the backup power supply device, a termination notification on shutdown of the computer device from the computer device, after notifying the computer of the output of the first and second detection signals; and
controlling the switch so that an output of the battery is not electrically coupled to the normal power supply device, after a predetermined time period after the termination notification is received.

15. A non-transitory computer-readable recording medium storing a program that causes a processor included in a backup power supply device that is electrically coupled to a normal power supply device, the normal power supply device including a first converter configured to convert a first alternating current voltage into a first direct-current voltage, to execute a process, the process comprising:
converting, by a second converter, a second alternating-current voltage inputted into the backup power supply device into a second direct-current voltage;
outputting, by a battery that is charged by the second direct-current voltage, a third direct-current voltage;
receiving, by a first detector, an output of the first converter from the normal power supply device, and outputting a first detection signal when a reduction of the first direct-current voltage outputted from the first converter is detected;
selectively supplying, by a switch that is electrically coupled to the normal power supply device, either a second direct-current voltage outputted from a second converter or a third direct-current voltage outputted from a battery to the normal power supply device by switching, when the first detection signal is received;
outputting, by a second detector, a second detection signal when a reduction of the second alternating-current voltage outputted from the second converter is detected;
receiving, by a control circuit coupled to a computer device operated by the normal power supply device or the backup power supply device, a termination notification on shutdown of the computer device from the computer device, after notifying the computer of the output of the first and second detection signals; and
controlling the switch so that an output of the battery is not electrically coupled to the normal power supply device, after a predetermined time period after the termination notification is received.

\* \* \* \* \*